April 18, 1967 E. T. SMITHLINE 3,315,229

BLOOD CELL RECOGNIZER

Filed Dec. 31, 1963 14 Sheets-Sheet 1

INVENTOR.
EDWARD T. SMITHLINE
BY Lester W Clark
ATTORNEY

April 18, 1967 E. T. SMITHLINE 3,315,229

BLOOD CELL RECOGNIZER

Filed Dec. 31, 1963 14 Sheets-Sheet 3

April 18, 1967 E. T. SMITHLINE 3,315,229

BLOOD CELL RECOGNIZER

Filed Dec. 31, 1963 14 Sheets-Sheet 6

April 18, 1967 E. T. SMITHLINE 3,315,229

BLOOD CELL RECOGNIZER

Filed Dec. 31, 1963

14 Sheets-Sheet 9

April 18, 1967 E. T. SMITHLINE 3,315,229

BLOOD CELL RECOGNIZER

Filed Dec. 31, 1963 14 Sheets-Sheet 12

| | Cell Shape (Fig. 13 Outputs) | | Cell Peripheral Length (Fig. 14 Outputs) | | | | Cell Interior Features (Fig. 18 Outputs) | | | | |
|---|---|---|---|---|---|---|---|---|---|---|---|
| | Circular | Non-Circular | ≥21 and ≤25 | ≥26 and ≤50 | ≥51 and ≤79 | ≤20 or ≥80 | Pink Cytoplasm | Light Blue Cytoplasm | Dark Blue Nucleus | Dark Blue Granules | Red Granules |
| Red Blood Cell | ✓ Yes | ✓ No | Yes | No | ✓ No | No | ✓ Yes | ✓ No | ✓ No | No | No |
| Neutrophile | ✓ Yes | ✓ No | No | Yes | No | ✓ No | ✓ Yes | ✓ No | ✓ Yes | No | ✓ No |
| Eosinophile | ✓ Yes | ✓ No | No | Yes | No | ✓ No | ✓ Yes | ✓ No | ✓ Yes | No | ✓ Yes |
| Basophile | ✓ Yes | ✓ No | No | Yes | No | ✓ No | ✓ No | ✓ Yes | Yes | ✓ Yes | No |
| Lymphocyte | ✓ Yes | ✓ No | No | ✓ Yes | No | No | ✓ No | ✓ Yes | Yes | ✓ No | No |
| Monocyte | ✓ Yes | ✓ No | No | No | ✓ Yes | No | No | ✓ Yes | Yes | ✓ No | No |

FIG. 21

United States Patent Office 3,315,229

Patented Apr. 18, 1967

3,315,229

BLOOD CELL RECOGNIZER

Edward T. Smithline, Lake Mohegan, N.Y., assignor to International Business Machines Corporation, New York, N.Y., a corporation of New York Filed Dec. 31, 1963, Ser. No. 334,876
21 Claims. (Cl. 340—146.3)

This invention relates to pattern recognition and, more particularly, to the recognition and classification of blood cells.

The automatic recognition of patterns finds important application in blood cell analyses, inasmuch as manual interrogation of blood samples to be categorized is time-consuming. Little has been done in the past, however, to adapt pattern recognition to this field. As a result, mass testing of entire population groups to detect the presence of disease has been impossible.

The present invention is directed toward a pattern recognition system primarily dealing with the recognition and categorization of blood cells. A slide containing a blood smear is stained and each of the blood cells thereon is interrogated. Specifically, the contour of each cell is detected to determine the size of the cell as well as its general configuration. Discriminating techniques are employed to consider for classification only cells of a specific shape and size. Following this, the cell is scanned to develop information concerning its internal features, e.g., the color of the cytoplasm as well as the presence and color of a nucleus and granules. The information regarding the cell size and shape and internal feature is utilized to classify the cell among the plurality of cell types normally present.

In a preferred embodiment of the invention, a cathode ray tube is employed to scan a slide containing blood cells stained with Wright's Stain. A typical raster scansion is used in a search mode to scan the slide. When the scanning beam strikes a blood cell, an alternate scanning mode is instituted. Specifically, the beam is caused to follow the contour of the blood cell. During this scanning mode, the peripheral length of the cell is detected to determine the size of the cell. Concurrently, the direction of movement of the scanning beam is detected to determine the general shape of the cell.

Following the first complete encirclement of the blood cell, the scanning beam circles the cell a second time. During the second encirclement, selected scansions across the cell are employed to detect the internal features of the cell. For example, spaced horizontal scansions are utilized to detect the color of the cytoplasm, the presence and color of a nucleus, and the presence and color of granules.

Following the second complete encirclement of the cell, the scanning beam is caused to jump across the cell and to recommence the search scanning mode described above. The information regarding cell shape and size as well as internal features for each cell detected is utilized to classify the cell.

Following is a more complete description of the invention, which is to be read in conjunction with the appended drawings, in which.

Figure 2:
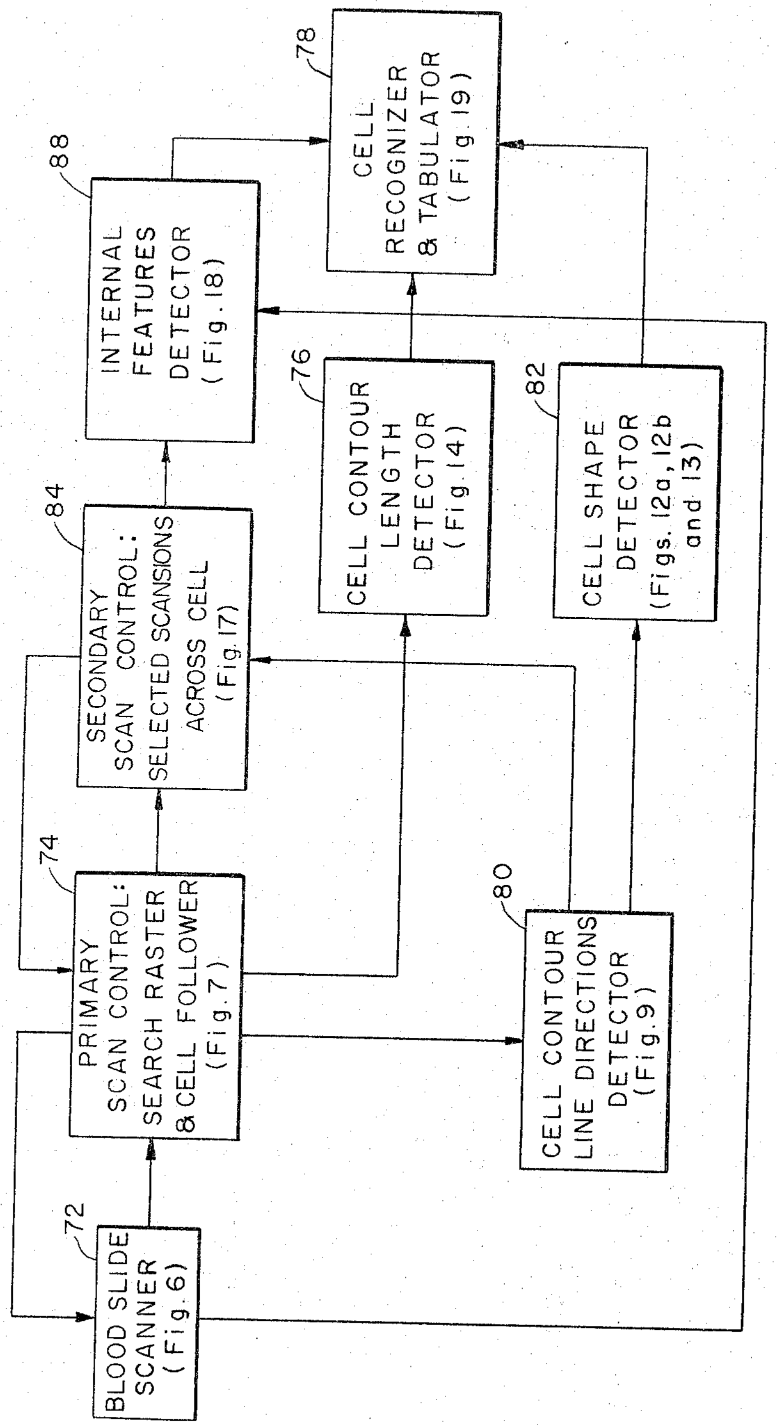
FIG. 2 is a block diagram of a representative pattern recognizing system in accordance with the invention.
Figure 13:
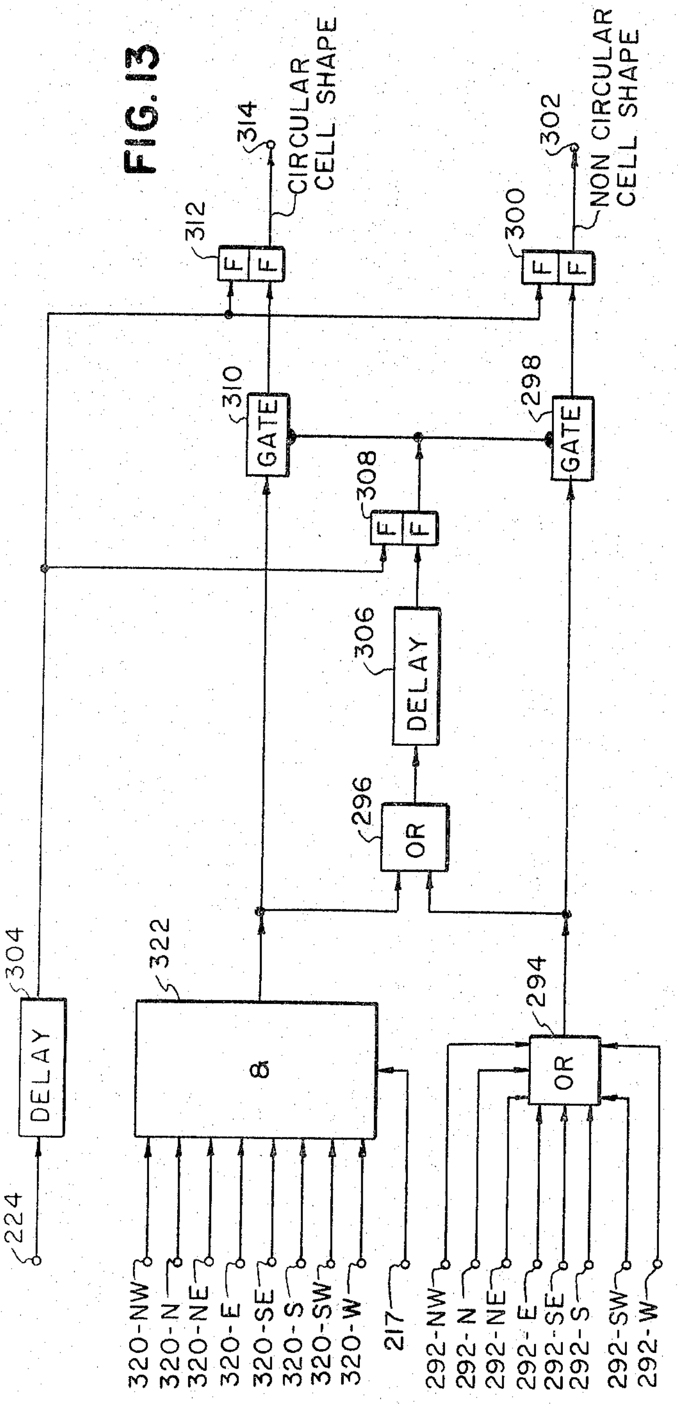
Figure 12A:
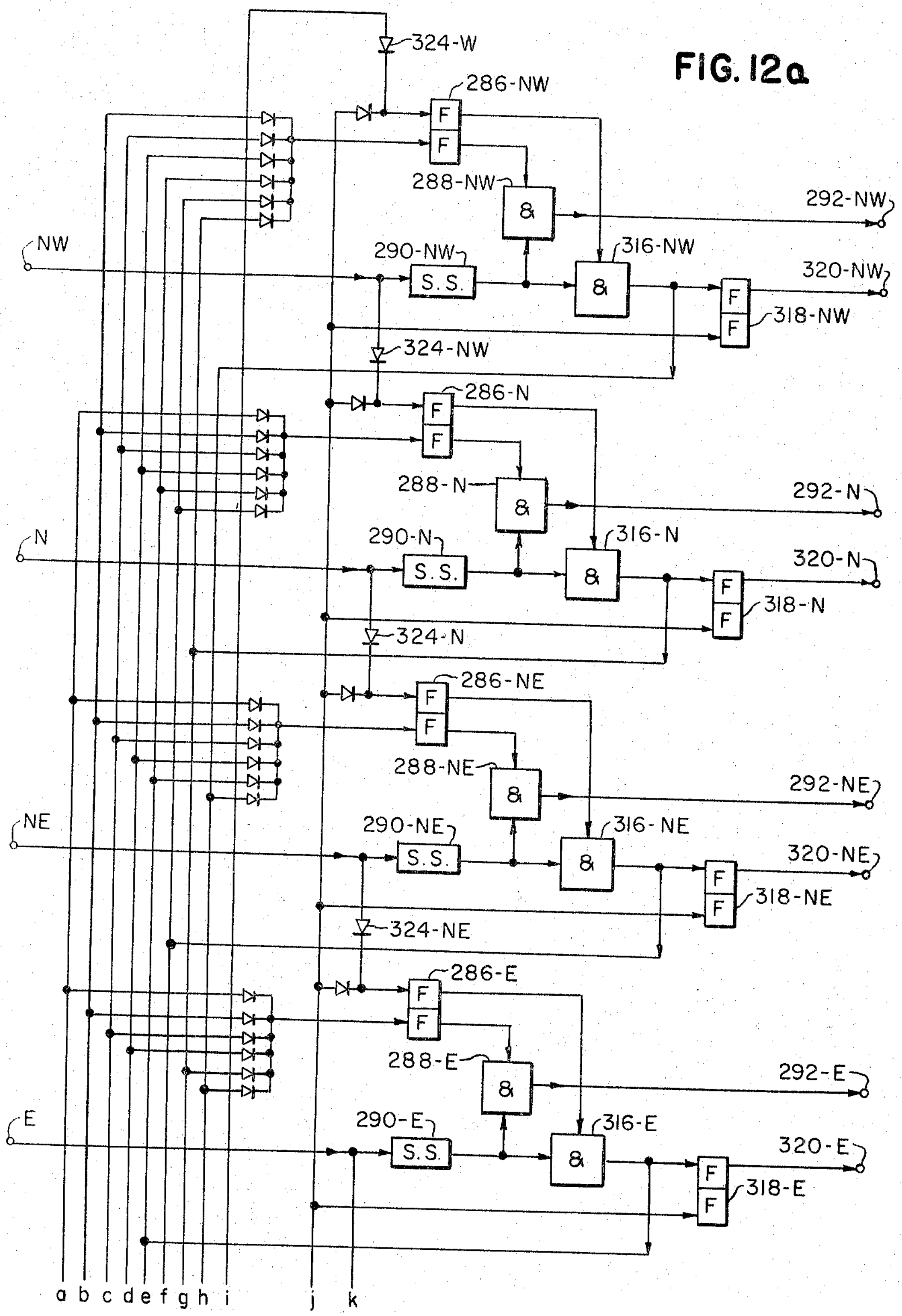
Figure 12B:
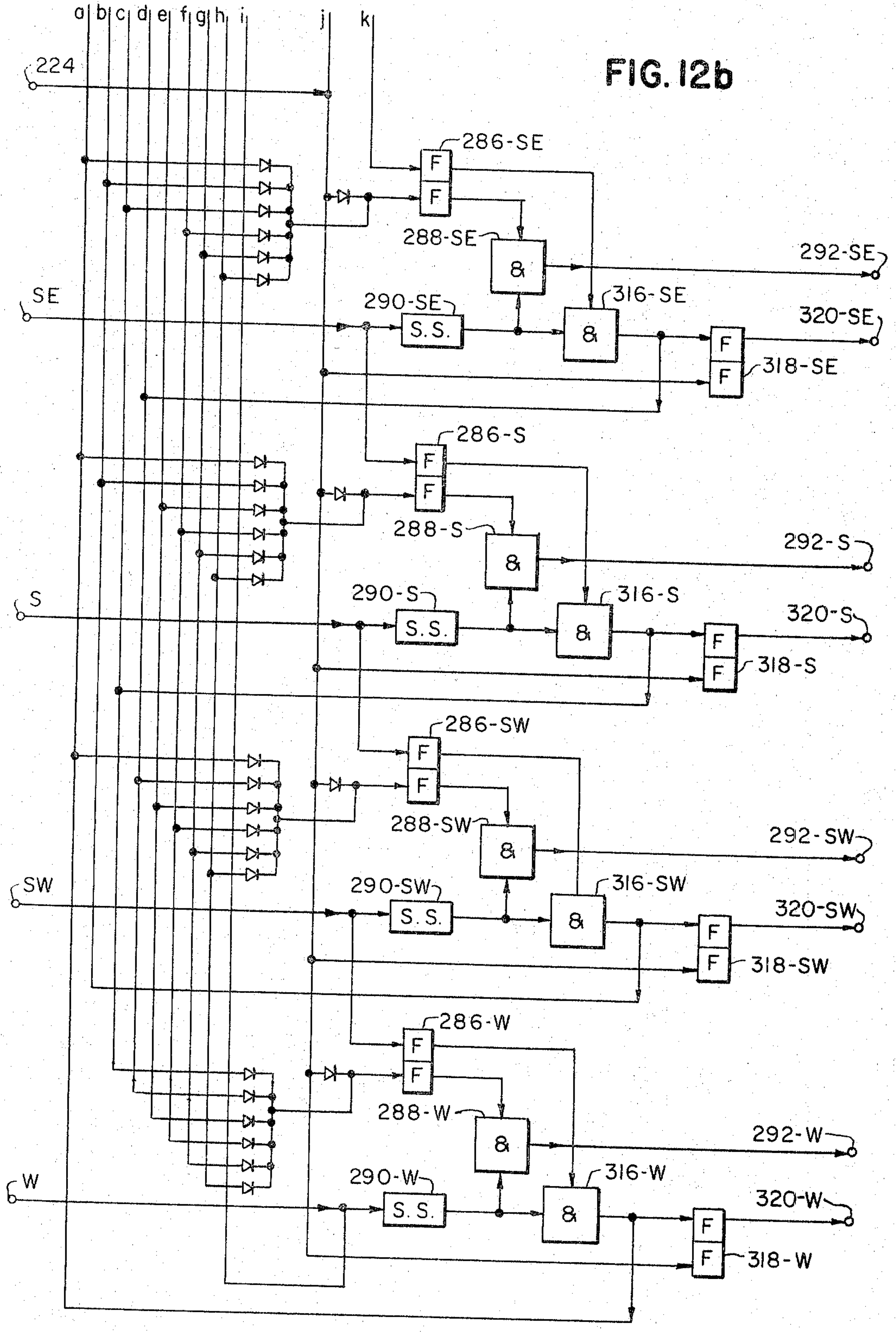
Figure 14:
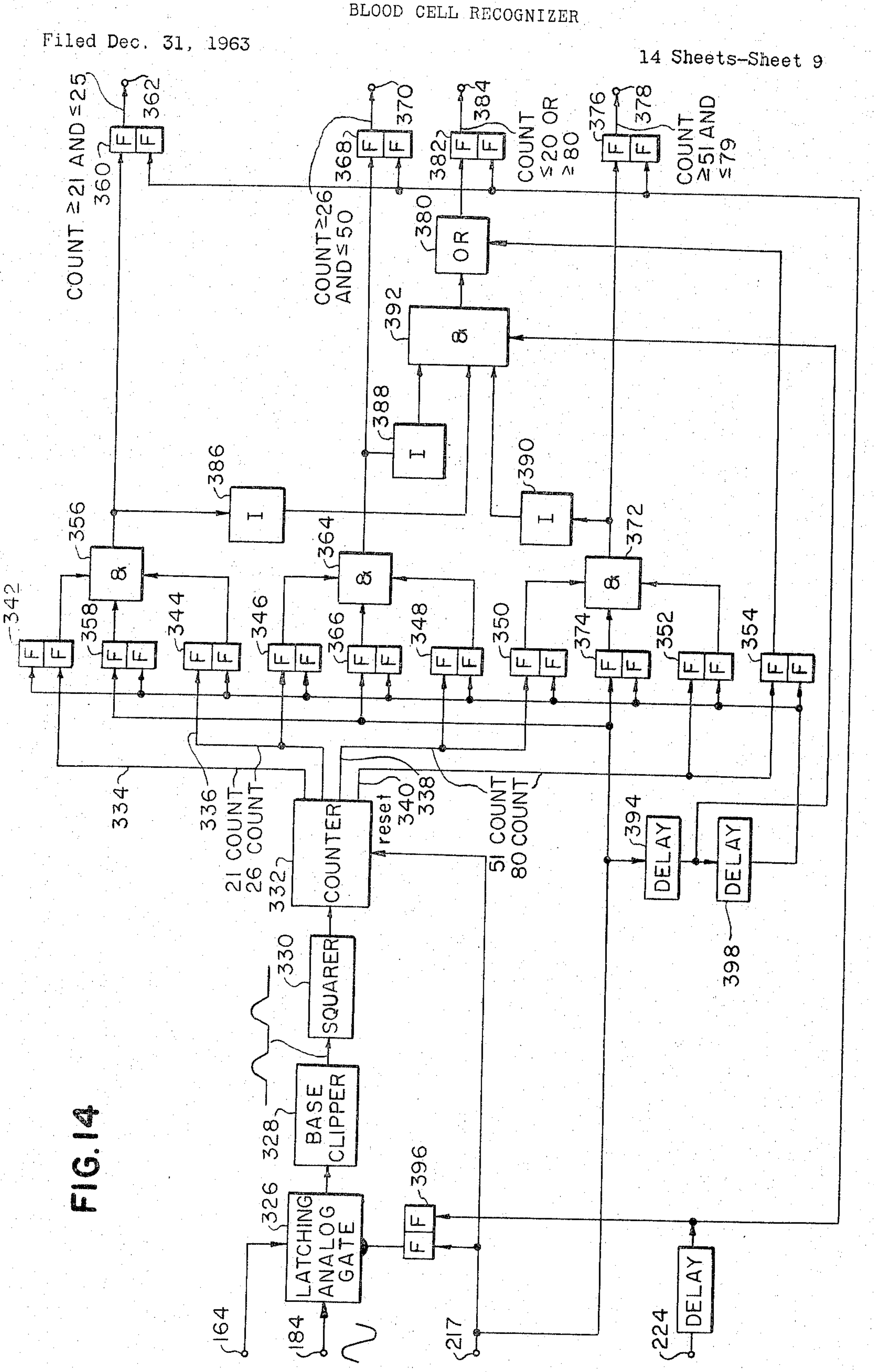
Figure 15:
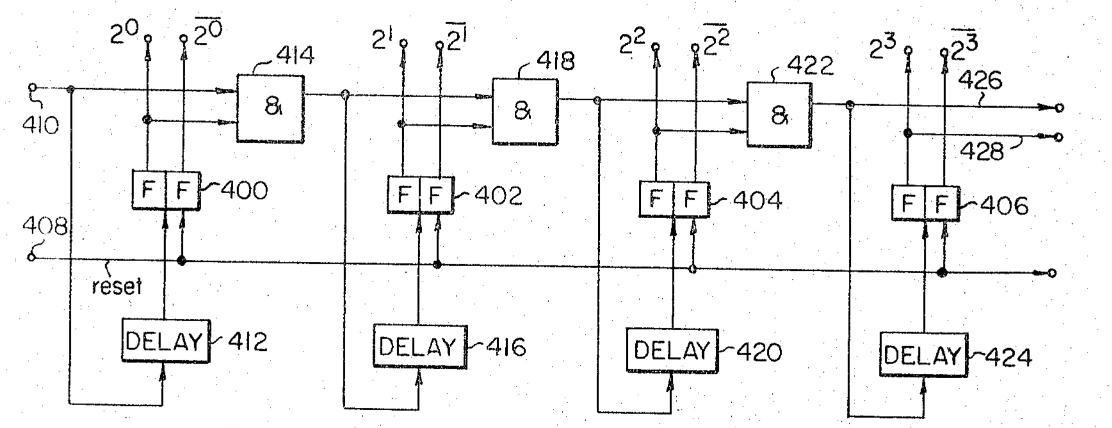
Figure 15A:
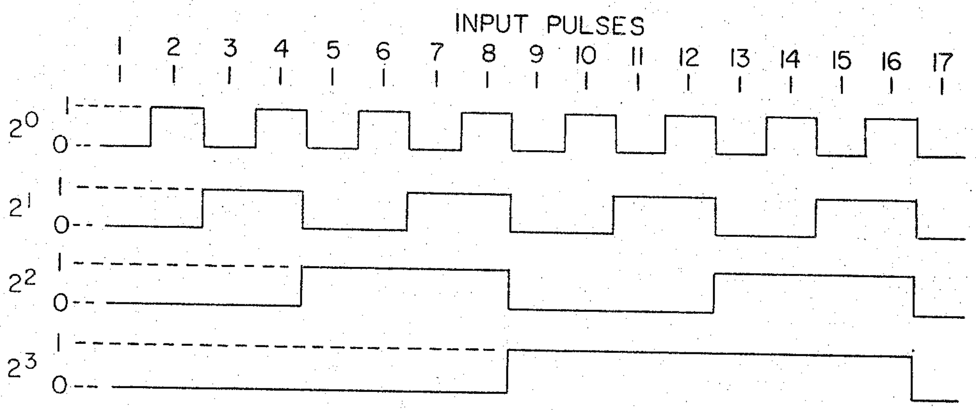
Figure 16:
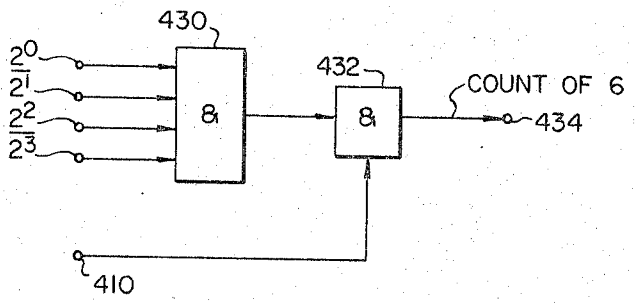
Figure 17:
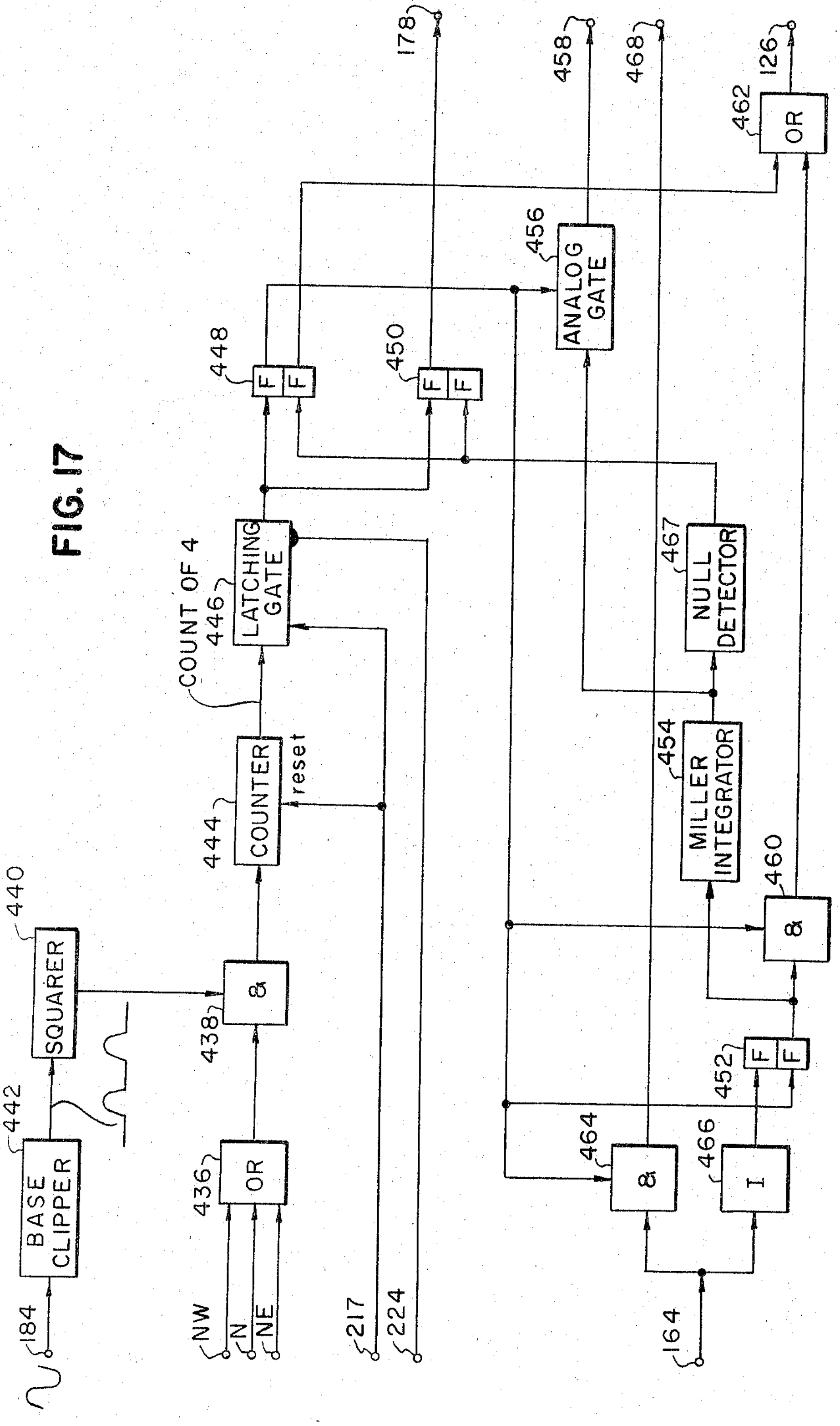
Figure 18:
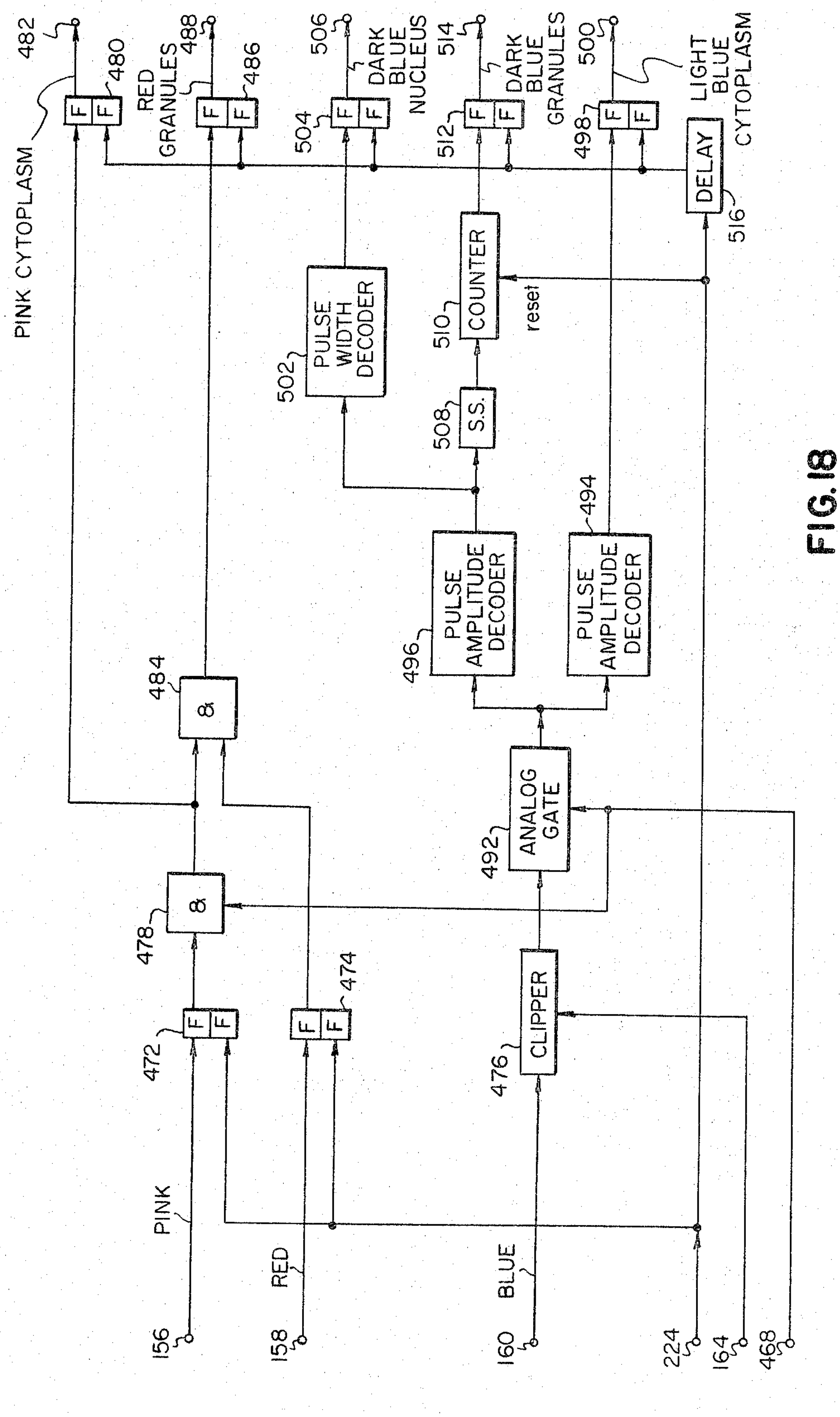
Figure 19:
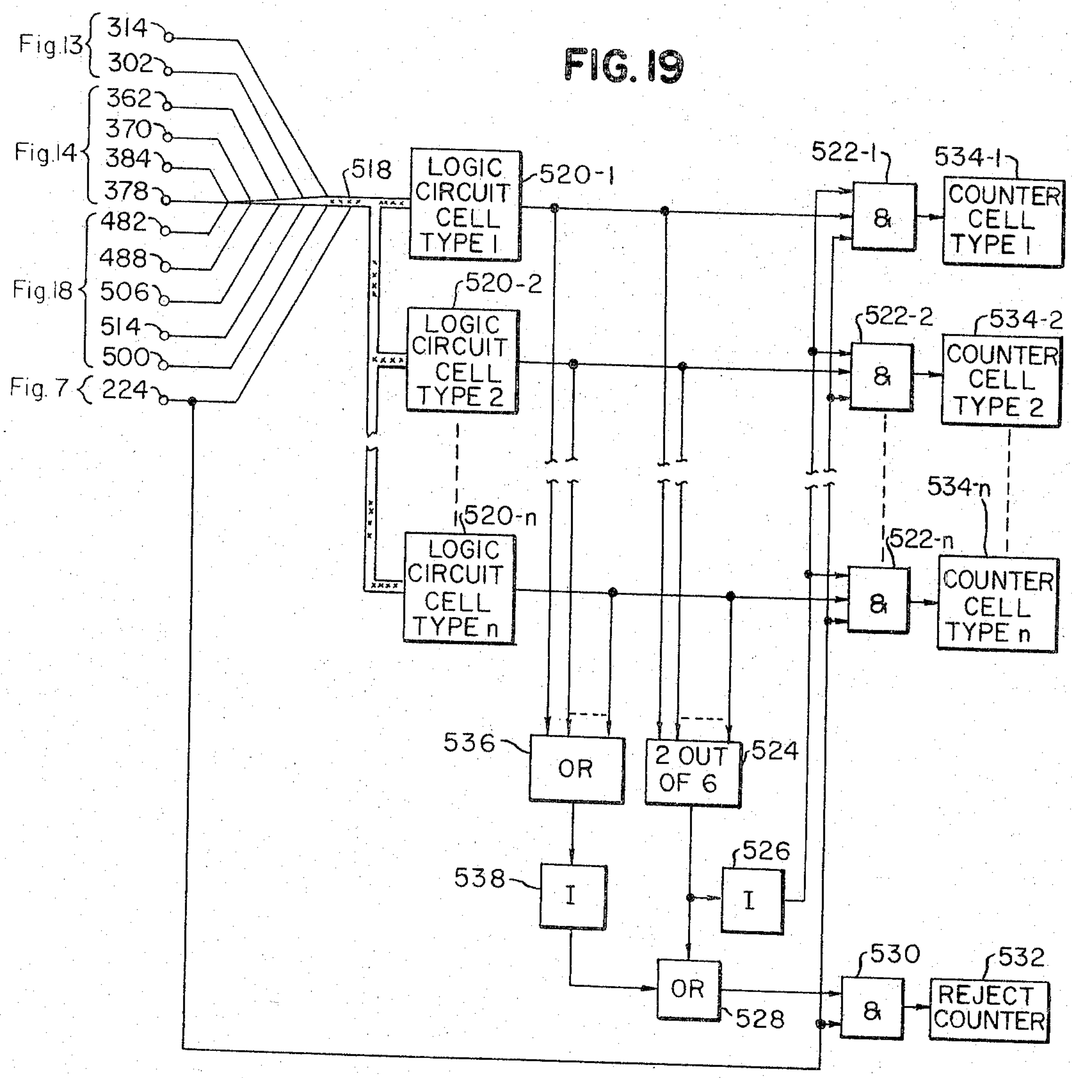
Figure 20:
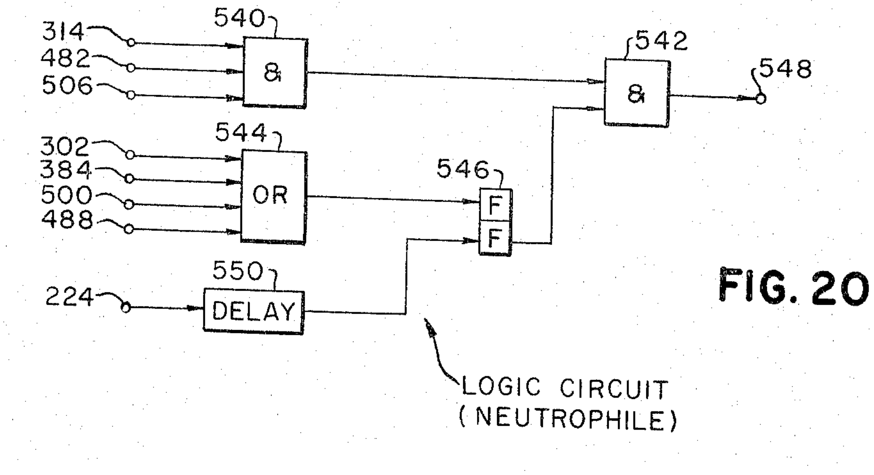

FIGS. 12*a* and 12*b*, taken together, as well as FIG. 13, are block diagrams of a representative circuit employed in the system of FIG. 2 to determine the shape of a blood cell;

FIG. 14 is a block diagram of a representative circuit employed in the system of FIG. 2 to determine the peripheral length of a blood cell;

FIGS. 15 and 16 are block diagrams of a representative counter forming a portion of the circuit of FIG. 14;

FIG. 15*a* is a waveform diagram illustrating the states of various portions of the circuit of FIG. 15;

FIG. 17 is a block diagram of a representative secondary scanning control circuit employed in the system of FIG. 2 for controlling the selected scansions of the scanning beam across a blood cell to determine the internal features of the cell;

FIG. 18 is a block diagram of a representative circuit employed in the system of FIG. 2 to determine the color of the cytoplasm and the presence and color of a nucleus and granules in a stained blood cell;

FIG. 19 is a block diagram of a representative circuit employed in the system of FIG. 2 to classify and tabulate the scanned blood cells;

FIG. 20 is a block diagram of a representative circuit forming a portion of the circuit of FIG. 19; and FIG. 21 is a table giving cell shape, peripheral length and internal features for different types of blood cells.

*General description*

Figure 1:
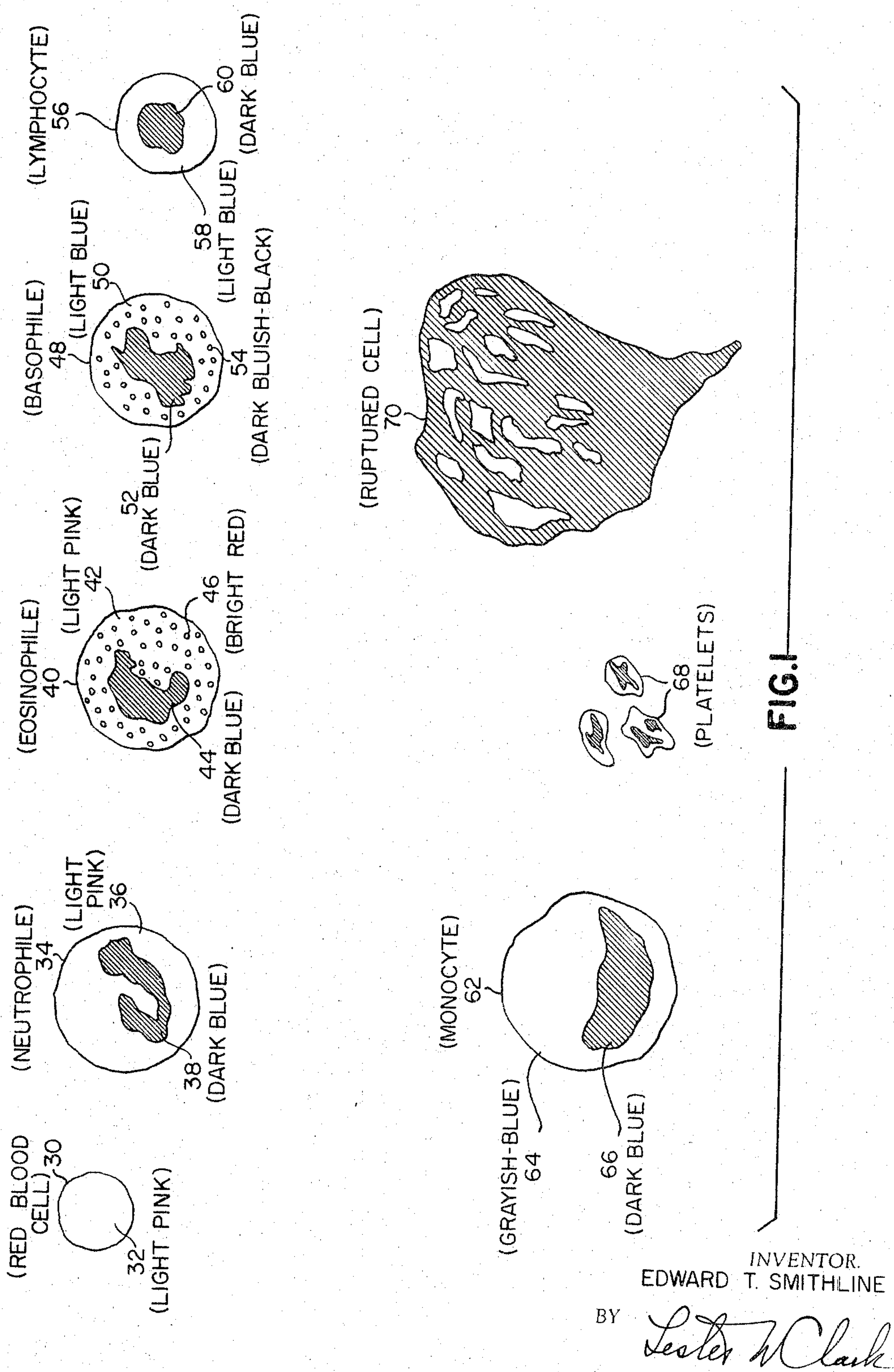
FIG. 1 is a series of enlarged diagrams of representative blood cells.

FIG. 1 is composed of enlarged diagrams of representative blood cells of the type recognized and classified in the present invention. The cells shown are stained by an agent such as Wright's Stain to develop characteristic colors. A red blood cell 30 is distinct from other cells in that it has no nucleus. Its cytoplasm 32 is light pink and its diameter is roughly 7–8 microns. Neutrophile 34 is a white blood cell having light pink cytoplasm 36 and a dark blue nucleus 38. The diameter of this cell is roughly 10–15 microns. Another white blood cell 40, an eosinophile, has light pink cytoplasim 42, a dark blue nucleus 44, and bright red granules 46. The diameter of this cell is roughly 10–15 microns. A third white blood cell 48, a basophile, has light blue cytoplasm 50, a dark blue nucleus 52 and dark bluish-black granules 54. The diameter of this cell is roughly 10–15 microns.

A further white blood cell 56, a lymphocyle, has light blue cytoplasm 58 and a dark blue nucleus 60. Its diameter varies from 9–16 microns. A final white blood cell 62, a monocyte, has grayish-blue cytoplasm 64 and a dark blue nucleus 66. The diameter of this cell is from 16–25 microns, rendering it the largest white blood cell to be found in normal blood.

Two other objects which may be found in normal blood are platelets 68 and ruptured cell 70. The diameter of each of the platelets is typically from 1–3 microns, while that of the ruptured cell is normally greater than 25 microns.

The proportions in the blood of the different types of ɔod are often indicative of different diseases, and are termined in blood cell analyses. For example, eosinoıiles normally constitute 5% of the white blood cells und in normal blood. If a person has an allergic contion, the percentage of eosinophiles generally increases ɔm 5% to over 25%. The percentage changes of the her white blood cells depend upon the infection present.

In the present invention, the red blood cell 30 and the ııite blood cells 34, 40, 48, 56 and 62 are recognized, assified and counted, inasmuch as the proportions of ese cells in the blood are indicative of many conditions. atelets 68 and ruptured cells 70 are not counted, as they e relatively unimportant.

The basis of recognition of the different blood cell pes is embodied in the shape and size of the cell, as ell as its internal configuration. The following table bulates for these cells, as well as the platelet and the ıptured cell, these different features.

The different cell types are tabulated to categorize the blood on the slide.

*Blood slide scanner 72*

Figure 5:
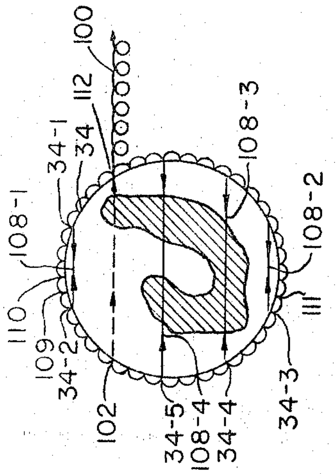
FIG. 5 is a diagram of the scanning beam movement during and just after the second encirclement of a blood cell.
Figure 4:
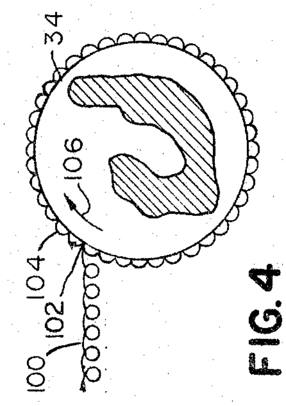
FIG. 4 is a diagram of the scanning beam movement just before and during the first complete encirclement of a blood cell.
Figure 3:
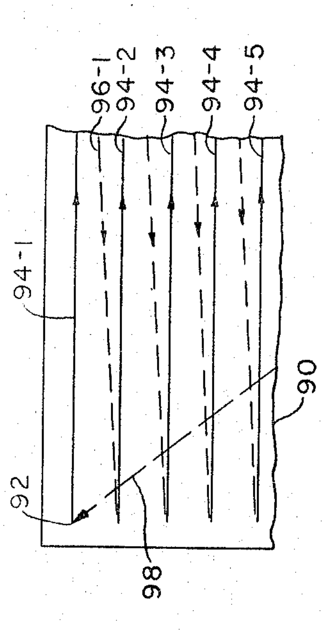
FIG. 3 is a diagram of a raster scansion employed during the search mode of a scanning beam.

The action of the scanner 72 is illustrated in FIGS. 3–5. FIG. 3 shows the raster scansion typically employed across a slide 90. The scansion commences at a point 92 and proceeds across the slide in a horizontal scan 94–1. At the end of the line scan, the scanning beam is blanked and returns via the path 96–1 to follow a second line scan 94–2. This action continues down the slide, resulting in active line scans 94–3, 94–4, 94–5 . . . to the bottom of the slide, from which the beam is blanked and returns via the path 98 to the starting point 92 for another scansion of the slide.

During the raster scansion across the slide 90, the scanning beam is provided with a small circular movement, as shown at 100 in FIG. 4. When the beam strikes a blood cell, such as the neutrophile 34 at point 102, the Table 1

| | Shape | Diam., μ | Cytoplasm | Nucleus | Granules |
|---|---|---|---|---|---|
| ed Blood Cell | Circ | 7–8 | Lt. pink | None | None. |
| eutrophile | Circ | 10–15 | do | Dk. blue | Do. |
| ɔsinophile | Circ | 10–15 | do | do | Bright red. |
| ısophile | Circ | 10–15 | Lt. blue | do | Blue-black. |
| ymphocyte | Circ | 9–16 | do | do | None. |
| onocyte | Circ | 16–25 | Gray-blue | do | Do. |
| atelet | Circ. and Irreg | 1–3 | | | |
| uptured Cell | Irreg | >25 | | | |

The red blood cell, as well as the monocyte, are typically istinguished by their sizes. The eosinophile is disnguished from the neutrophile by the presence of bright ɔd granules. The basophile is distinguished from the ʼmphocyte typically by the presence of blue-black granles. The platelet and ruptured cell may be distinguished nd rejected on size.

*The system of FIG. 2*

The system of FIG. 2 recognizes, classifies and tabulates ifferent types of blood cells. The system comprises a lood slide scanner 72 which scans a blood slide containıg blood cells stained with Wright's Stain, for example. ʼhe scanner is under the control of a primary scan control 4 which typically initiates a search raster scansion across ıe slide. When the scanning beam encounters a blood ɜll, a cell following scanning action is instituted so that ıe scanning beam follows the contour of the cell. The rimary scan control is coupled to a cell contour length etector 76 which determines the peripheral length of ıe cell during a complete encirclement of the cell by the ɔanning beam. The detector 76 applies this information ɔ a cell recognizer and tabulator 78.

During the encirclement of the cell, a cell contour line irections detector 80 determines the direction of moveıent of the scanning beam and hence the directions of ıe various line segments which together define the periphry of the cell. This information is applied to a cell hape detector 82 and to a secondary scan control 84. ʼhe shape detector determines the shape of the cell and pplies this information to the cell recognizer and tabuıtor 78.

After the encirclement of the cell, the secondary scan ontrol 84 is activated which causes the scanning beam ɔ encircle the cell a second time. During the second enirclement, and when the scanning beam is travelling in elected directions, the beam is caused to scan across the ell in spaced scansions to determine the internal feaures of the cell. As the scanning beam scans across the ell, the internal features are detected by an internal feaures detector 88 which supplies this information to the ell recognizer and tabulator 78.

The cell recognizer and tabulator 78 classifies the ʼlood cells scanned based upon the information regarding ell contour length, cell shape and internal configuration.

raster scansion is discontinued, and contour-following scan 104 is instituted, which proceeds around the periphery of the cell in the direction of the arrow 106.

FIG. 5 shows the second complete encirclement of the scanning beam around the neutrophile 34. The beam commences from the point 102 after the first complete encirclement shown in FIG. 4. Selected horizontal scansions 108–1, 108–2, 108–3 and 108–4 are employed across the cell to determine its internal configuration. During each of these transverse scansions, the circular motion of the beam is normally terminated. Each scansion proceeds from left to right in FIG. 5 and occurs after a predetermined number of interceptions of the scanning beam with the periphery of the cell. For example, the scansion 108–1 from left to right across the cell occurs after the fourth intersection of the scanning beam with the cell at point 34–2. When the beam hits right-hand point 34–1, it is blanked and returns to the point 34–2 to continue its course around the cell.

In similar fashion the scansions 108–2, 108–3 and 108–4 occur. These commence from points 34–3, 34–4 and 34–5, respectively, after every fourth intersection of the scanning beam with the periphery of the cell. The scansions across the cell occur when the beam is travelling generally in the northwest, north or northeast direction. Thus, after the intersection 34–2, the beam makes only two more intersections 109 and 110 with the periphery of the cell while travelling in the northeasterly direction at the top of the cell. These two intersections, together with the two intersections 111 and 34–3 when the beam is travelling in a northwesterly direction at the bottom of the cell, constitute four intersections and trigger the line scan 108–2 across the cell.

After the scanning beam has returned to the starting point 102, the beam moves across the cell to beyond point 112, and again commences the raster scansion 100 until the next cell is encountered.

Figure 6:
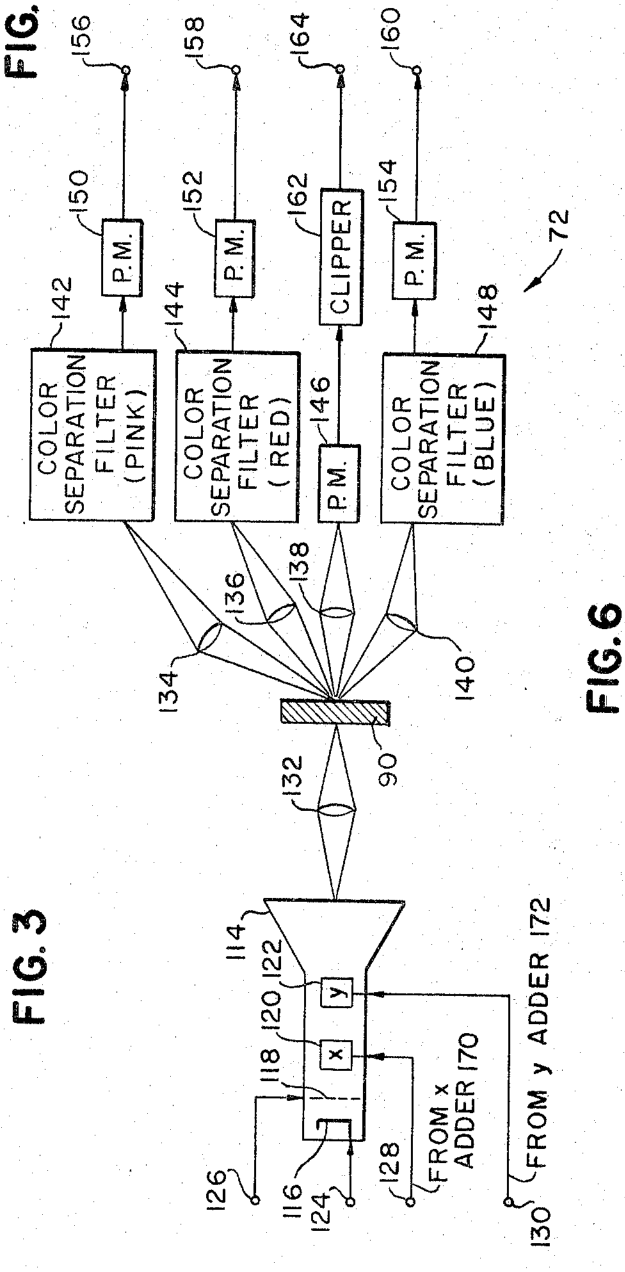
FIG. 6 is a block diagram of a representative scanning circuit employed in the system of FIG. 2.

FIG. 6 shows the scanner 72 in detail. It comprises a cathode ray tube 114 having a beam-forming electrode 116, beam intensity control electrode 118, and $x$ and $y$ deflection plates 120 and 122, respectively. The electrode 116 is connected to a terminal 124 which is supplied with a suitable potential. The control electrode 118, and the $x$ and $y$ deflection plates 120 and 122 are connected to terminals 126, 128 and 130, respectively, which receive signals, as will be explained later, to control the scanning action. A lens 132 images the beam within the tube upon the slide 90 containing the different blood cells to be recognized and classified. Light passing through the slide is imaged by lenses 134, 136, 138 and 140 upon filters 142 and 144, photomultiplier 146 and filter 148, respectively. The filters 142, 144 and 148 are color separation filters which pass light only when light of the colors pink, red and blue, respectively, are imaged thereupon from the slide 90. Light from the filters 142, 144 and 148 is detected by photomultipliers 150, 152 and 154, respectively, to generate output signals at terminals 156, 158 and 160, respectively.

The photomultiplier 146 detects all the light that passes through the slide 90 and generates a representative signal. This signal is clipped in a clipper 162 and applied to an output terminal 164.

*Primary scan control 74*

Figure 7:
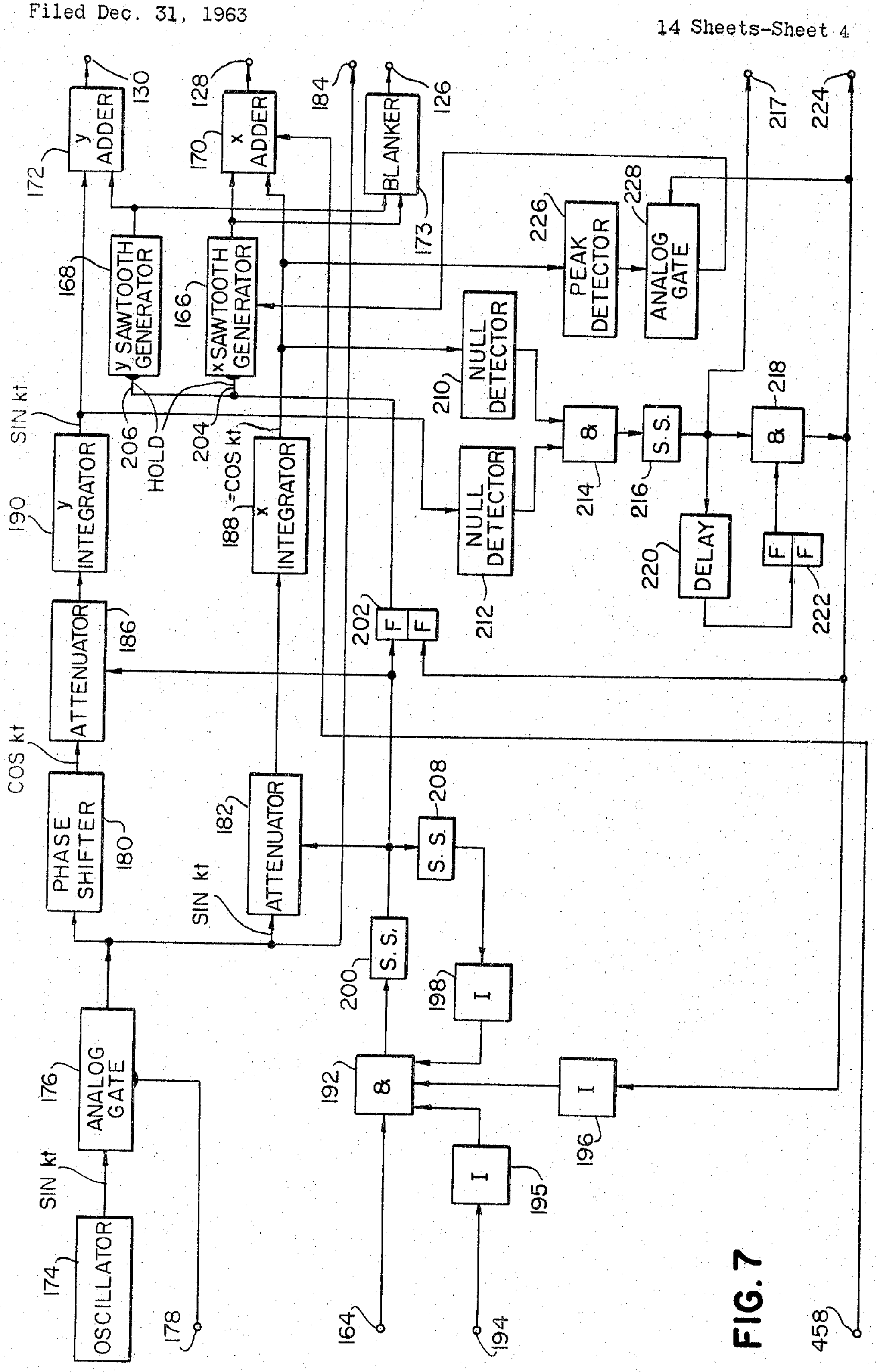
FIG. 7 is a block diagram of a representative primary scan control circuit employed in the system of FIG. 2 for controlling the search raster and the cell following scansions of the scanning beam.

FIG. 7 shows a circuit for controlling the search raster scan and the cell following scan of the scanning beam in the cathode ray tube 114 of FIG. 6. As pointed out with respect to FIGS. 3 and 4, the beam follows a search raster across the slide 90 with a small circular motion superimposed thereupon. This is accomplished by $x$ and $y$ sawtooth generators 166 and 168 which generate sawtooth signals applied to $x$ adder 170 and $y$ adder 172, respectively. The output signals from the $x$ and $y$ adders appear at the terminals 128 and 130; the sawtooth signals produce the raster scansion across the blood cell 90. A blanker 173 connected to the sawtooth generators 166 and 178 generates blanking signals at the terminal 126 (FIG. 6) for blanking the scanning beam during horizontal and vertical retrace.

It should be noted that the distance between the active line scans 94–1, 94–2, 94–3 . . . in FIG. 3 is typically chosen to be much greater than the diameter of the average blood cell. In this fashion, when a blood cell is encountered by the scanning beam and then interrogated, it is fairly certain that the cell will not be encountered again when the search raster scan is recommenced.

The small circular motion of the scanning beam is developed through the use of an oscillator 174 which generates a signal representative of sine $kt$, where $k$ is a constant and $t$ represents time. This signal is passed through an analog gate 176 inhibited by a signal applied to a terminal 178. Normally no signal is present at the terminal, and the analog gate passes the signal from the oscillator to a phase shifter 180, to an attenuator 182 and directly to an output terminal 184. The phase shifter 180 typically shifts the phase of the signal from the oscillator 174 by 90°, thereby generating a signal representative of cos $kt$ which is applied to an attenuator 186.

The attenuators 182 and 186 normally do not attenuate the signals applied thereto, and the sine and cos signals are passed unmodified to integrators 188 and 190, respectively. The output signal from the integrator 188 is representative of $-$cos $kt$, while the output signal from the integrator 190 is representative of sine $kt$. The cos and sine signals are applied to the $x$ and $y$ adders 170 and 172, respectively, to be added to the $x$ and $y$ sawtooth signals applied to the deflection plates of the cathode ray tube 114. As is well known, cos and sine signals applied to the deflection plates of a cathode ray tube produce a circular motion of the beam developed in the tube.

Accordingly, the beam in the cathode ray tube follows the search scanning raster shown in FIG. 3, with the small circular motion superimposed thereupon as shown at 100 in FIG. 4.

When the scanning beam hits a blood cell, as at the point 102 in FIG. 4, a signal is generated by the clipper

162 of FIG. 6 appearing at the terminal 164. From FIG. 7, the terminal 164 is connected to AND gate 192, also supplied with a signal from terminal 194, after inversion in inverter 195, and with signals from inverters 196 and 198. Normally, all of the inverters energize the gate 192, and accordingly the signal from the terminal 164 is passed through the gate to activate a single shot (monostable multivibrator) 200. The single shot generates a pulse signal of limited duration which sets a flip-flop (bistable multivibrator) 202. An output signal from the set flip-flop is applied to hold inputs 204 and 206 of $x$ and $y$ sawtooth generators 166 and 168, respectively, to prevent the output signals from the generators from changing. Accordingly, the scanning raster stops, as at the point 102 in FIG. 4, after the blood cell is hit by the scanning beam.

The pulse from the single shot 200 is also applied to the attenuators 182 and 186 to attenuate the sine and cos signals applied thereto and hence to reduce the radius of the circular movement of the scanning beam. Typically, the radius is reduced many times. The duration of the pulse signal from the single shot 200 is chosen to be typically equal to 180° or one half the period of the signal from the oscillator 174. During this time, the scanning beam passes into and out of the blood cell 34 shown in FIG. 4 with a tiny semicircular movement. When the signal from the single shot 200 terminates, the large circular beam movement is reinstated since the attenuators 182 and 186 are no longer energized. The terminating single shot signal triggers a single shot 208 whose output signal is inverted by the inverter 198. The energized inverter removes an enabling input from the AND gate 192, preventing a signal from passing through the gate. The time that the single shot 208 is triggered on is generally equal to 30° or one twelfth of the period of the signal from the oscillator 174. This prevents a signal from the clipper 162 of FIG. 6 from triggering the single shot 200. Such a signal may be present if the scanning beam is still within the blood cell when the large circular beam movement is reinstated.

The action of the circuit in FIG. 7 in controlling the attenuators 182 and 186 is the same as that described in the copending application of Evon C. Greanias, Ser. No. 248,585, filed December 31, 1962 for Electronic Servo System, assigned to the assignee of the present application. As there described, the circuit operates to cause the scanning beam to follow the contour of the blood cell, as shown by the scansion 104 proceeding in the direction of the arrow 106 in FIG. 4. The selected attenuation of the sine and cos signals produces this scanning action. The integrators 188 and 190 generate signals representative of the $x$ and $y$ coordinates of the scanning beam with respect to the beginning point 102 shown in FIG. 4. These signals are added in the adders 170 and 172 to the fixed signals from the sawtooth generators 166 and 168, respectively.

The signals from the integrators 188 and 190 are applied to null detectors 210 and 212, respectively, whose output signals are applied to an AND gate 214. Signals from the null detectors are generated when the $x$ and $y$ coordinates of the beam with respect to the point 102 in FIG. 4 are zero. These signals are together generated, activating the AND gate 214, when the scanning beam makes a complete encirclement of the cell 34 of FIG. 4 and returns to the point 102. At this time, a single shot 216 is triggered to generate a pulse signal of limited duration applied to an output terminal 217, to an AND gate 218, and through a delay 220 to a flip-flop 222. Successive signals from the delay 220 alternately set and reset the flip-flop. In this instance, after the first encirclement of the blood cell, the flip-flop is set, providing an enabling input to the AND gate 218. The delay period of the delay 220, however, is sufficiently long so that the flip-flop 222 is not set until the single shot 216 has returned to its off condition. Accordingly, the circuit FIG. 7 operates to provide a second complete encircle- ənt of the blood cell.

After the second complete encirclement of the blood ll, the null detectors 210 and 212 again energize the ıgle shot 216. Inasmuch as the flip-flop 222 is presently t, the AND gate 218 is now activated, generating an ıtput signal at a terminal 224. The signal from the ND gate 218 is also employed to reset the flip-flop 202, ereby removing the signal from the inputs 204 and 206 the $x$ and $y$ sawtooth generators 166 and 168, which ːrmits the sawtooth generators again to generate the ȝnals producing the search raster of the scanning beam. oncurrently, the signal from the AND gate 218 is applied the inverter 196, which removes an enabling input to e AND gate 192 and prevents the single shot 200 from ːing triggered.

It will be noted that the $x$ integrator 188 is coupled a peak detector 226 which detects and stores the ːak magnitude of the $x$ signal from the integrator, repre- nting the diameter of the cell scanned. This signal coupled through an analog gate 228, enabled by the gnal from the AND gate 218, to the $x$ sawtooth generator 56. Accordingly, at the time the search raster of the ːanning beam is reinstituted following the completion f the second encirclement of the blood cell, the signal om the $x$ sawtooth generator is increased by the amount f the signal from the peak detector 226 to ensure that ıe scanning raster commences beyond the point 112, as ıown in FIG. 5. By this time the inverter 196 is no ınger energized, and the gate 192 is open to trigger the ngle shot 200 when the next blood cell is encountered nd to repeat the cell following scanning action just escribed.

*Cell contour line directions detector 80*

During the first complete encirclement of the scanning eam around a blood cell, the signals from the $x$ and $y$ dders 170 and 172 of FIG. 7, representative of the $x$ and coordinates of the scanning beam, are employed to de- ːrmine the directions of movement of the beam. This ı effect determines the directions of the line segments ıat define the periphery of the blood cell. Referring to 'IG. 8, an arrow 230 depicts the direction of movement f a scanning beam following a circular cell. The move- ıent may be broken into eight basic directions such as I, NE, E, SE, S, SW, W and NW. Of course more lirectional indications may be provided, but generally ight are sufficient to categorize the beam movement.

Figure 9:
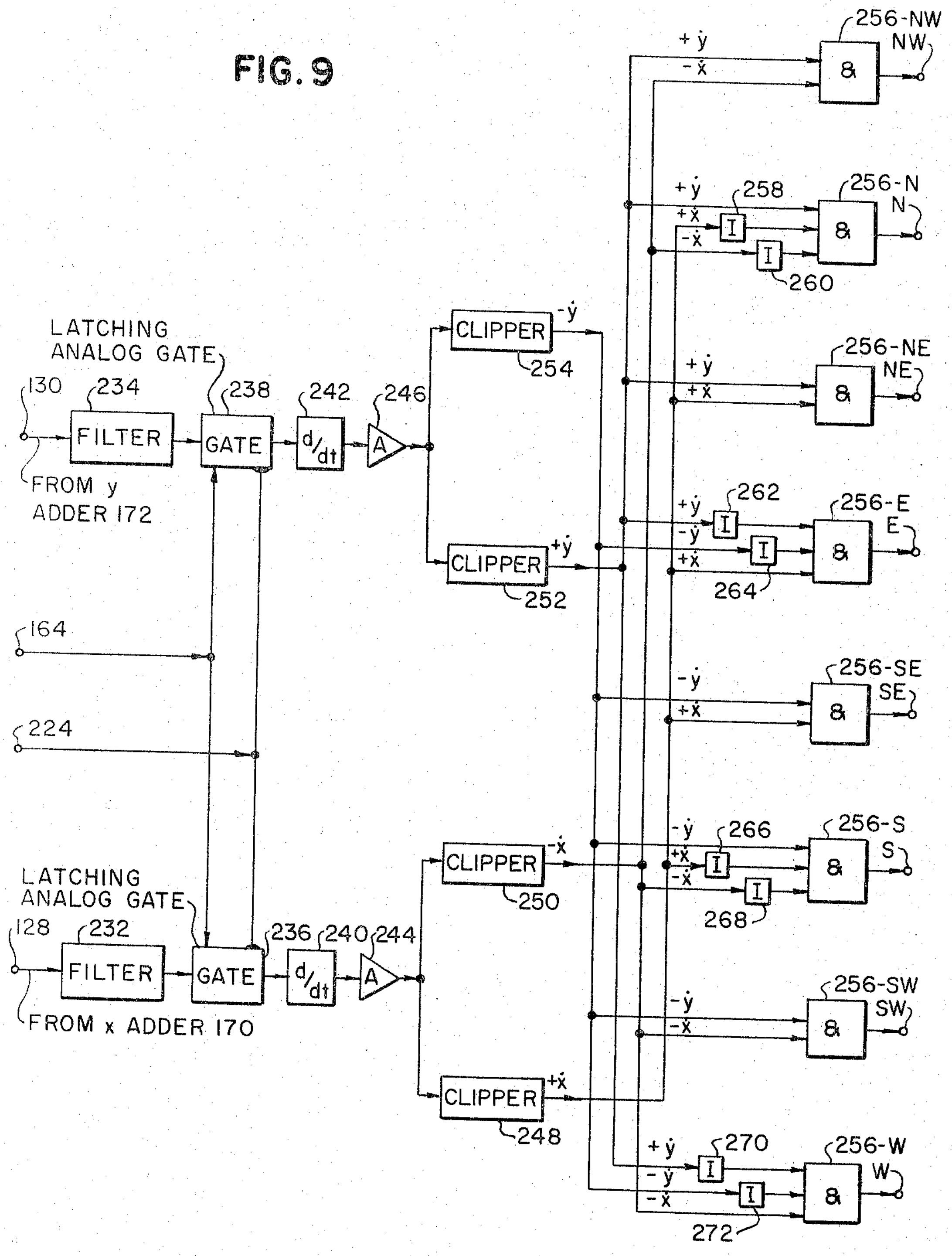
FIG. 9 is a block diagram of a representative circuit employed in the system of FIG. 2 to determine the general direction of movement of the scanning beam.

Referring to FIG. 9, a circuit is shown for detecting he directions of movement of the scanning beam. The ignals from the $x$ and $y$ adders 170 and 172 appearing t the terminals 128 and 130, respectively, are coupled o filters 232 and 234, respectively. The filters remove rom the $x$ and $y$ signals the components representative f the relatively high frequency circular movement of he scanning beam. The signals from the filters are ap- ɔlied to latching analog gates 236 and 238 which are ːnabled by the first signal generated by the clipper 162 f FIG. 6 appearing at the terminal 164. This signal is ȝenerated when the scanning beam first strikes the blood ːell and the first encirclement of the blood cell is initiated.

The signals from the gates 236 and 238 are differen- iated in differentiators 240 and 242, respectively. The lifferentiated signals are amplified in amplifiers 244 and 246 coupled to clippers 248, 250 and 252, 254, respec- tively. The output signals from the clippers 248 and 250 are representative of $+\dot{x}$ and $-\dot{x}$, respectively, i.e., the positive and negative derivatives of the $x$ signal from the filter 232. The signals from the clippers 252 and 254 are representative of $+\dot{y}$ and $-\dot{y}$, respectively, i.e., the positive and negative derivatives of the $y$ signal from the filter 234.

The following table tabulates for eight different direc- tions of scanning beam movement the values of the $y$ and $x$ derivatives.

Table 2

| | $\dot{y}$ | $\dot{x}$ |
|---|---|---|
| NW | + | − |
| N | + | 0 |
| NE | + | + |
| E | 0 | + |
| SE | − | + |
| S | − | 0 |
| SW | − | − |
| W | 0 | − |

For example, when the scanning beam is travelling in a general northeasterly direction along the periphery of a blood cell, the $x$ and $y$ components of the beam movement are both increasing, resulting in positive derivatives.

In FIG. 9, AND gates 256–NW, 256–N, 256–NE, 256–E, 256–SE, 256–S, 256–SW and 256–W generate output signals representative of the different directions of scanning beam movement. The direction represented by each gate is given by the letters following the number 256. The following table is an amplification of Table 2, and designates the input signals necessary to produce a directional output signal from a particular one of the AND gates 256.

TABLE 3

| | $+\dot{y}$ | $-\dot{y}$ | $+\dot{x}$ | $-\dot{x}$ |
|---|---|---|---|---|
| NW | Yes | | | Yes |
| N | Yes | | No | No |
| NE | Yes | | Yes | |
| E | No | No | Yes | |
| SE | | Yes | Yes | |
| S | | Yes | No | No |
| SW | | Yes | | Yes |
| W | No | No | | Yes |

It will be noted that the presence of any one or more of the derivative signals $+\dot{y}$, $+\dot{x}$ and $-\dot{x}$ for a particular direction is represented in Table 3 by "yes" in the appropriate column and in the row corresponding to that direction. A 0 value of any derivative input signal, for example, the 0 value of the $y$ derivative for the direction E in Table 2, is represented in Table 3 by the designation "no" in both of the columns $+\dot{y}$ and $-\dot{y}$ for the direction E.

The absence of a derivative signal results in the generation of a discrete signal through the use of an inverter. In FIG. 9, it will be noted that inverters 258, 260, 262, 264, 266, 268, 270 and 272 are employed for this purpose. For example, from Table 3 it is indicated that when the beam is moving in a general easterly direction $+\dot{y}$ and $-\dot{y}$ signals are both absent while the signal $+\dot{x}$ is present. In FIG. 9 the AND gate 256–E is accordingly provided with the signal $+\dot{x}$ from the clipper 248 and with the signals $+\dot{y}$ and $-\dot{y}$ from the clippers 252 and 254, respectively, after inversion in the inverters 264 and 262, respectively.

The AND gates 256, when activated, generate output signals at the output terminals designated NW, N, NE, E, SE, S, SW and W.

*Cell shape detector 82*

The signals from the circuit of FIG. 9 representing the general directions of movement of the scanning beam in following the contour of a blood cell are utilized to determine the shape of the cell. It will be noted from FIG. 1 that the blood cells there shown are generally circular in shape. The terms "circle" and "circular" as used herein, including the claims, are intended not to be limited to pure circles but rather to designate curves that approximate circles as well as ellipses. The blood cells that are typically of interest in detecting various diseases are generally circular. Matter not of interest, such as the platelets 68 and the ruptured cell 70 of FIG. 1, generally are not circular and may be distinguished on this basis.

The present invention determines whether or not a scanned object is circular.

Figure 8:
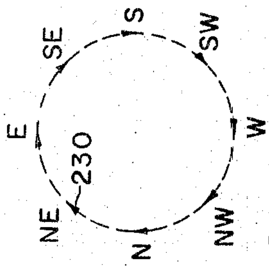
FIG. 8 is a diagram of the different directions of scanning beam movement as the beam encircles an object.
Figure 11:
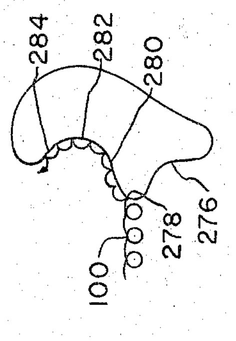
FIGS. 10 and 11 are diagrams of two different blood cells as partially encircled by a scanning beam.
Figure 10:
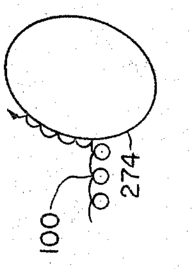

In FIG. 10 there is shown a blood cell 274 which is generally circular in shape. In following the contour of the cell, the scanning beam 100 generally moves in the directions shown in FIG. 8, with the sequence being N, NE, E, SE, S, SW, W and NW. FIG. 11 shows a noncircular blood cell 276. In this case, the scanning beam 100 striking point 278 travels first in a generally northeasterly direction when following peripheral segment 280. The beam next travels generally northerly when following the next segment 282. The next direction of beam movement, however, is generally northwesterly along peripheral segment 284.

It will be noted, then, that whenever the scanning beam is following a generally circular blood cell, the sequence of beam movement directions is given by the following diagram.

*Diagram 1*

```
         N
   NW        NE
 W              E
   SW        SE
         S
```

The initial beam movement may be NW, N, NE or E when a search scansion is employed that proceeds from left to right across a blood slide and when the movement of the beam during the following action is in a clockwise direction around the blood cell. It is impossible to have an initial beam movement in any of the directions SE, S, SW and W unless the object is noncircular. The sequence of directions for a circle is obtained from Diagram 1 by starting at any of the directions NW, N, NE and E and proceeding in a clockwise fashion around the diagram.

The circuit shown in FIGS. 12a and 12b, which are to be taken together, and in FIG. 13 utilizes Diagram 1 in detecting whether or not a blood cell followed by the scanning beam is circular or noncircular. If the sequence of directions is as given in Diagram 1, the cell is taken as circular. If the sequence departs at any time during the following action from this sequence, the blood cell is taken as noncircular.

Referring to FIGS. 12a and 12b, signals representing the directions of movement of the scanning beam, as developed by the circuit of FIG. 9, appear at the terminals NW, N, NE, E, SE, S, SW and W. The circuit includes a plurality of flip-flops 286–NW, 286–NE, 286–E, 286–SE, 286–S, 286–SW and 286–W. The flip-flops 286–NW, 286–N, 286–NE and 286–E, representing the four permissible initial beam movement directions for a circle, are set by a signal applied to the terminal 224. This terminal is part of the circuit of FIG. 7 and receives a signal at the completion of the second encirclement of a blood cell, as described above. The signal from the terminal 224 resets the flip-flops 286–SE, 286–S, 286–SW and 286–W. This readies the circuit for the next blood cell to be encountered.

The resetting of the flip-flops 286–SE, 286–S, 286–SW and 286–W energizes one input of associated AND gates 288–SE, 288–S, 288–SW and 288–W, respectively. If, when the next blood cell is encountered, the initial beam movement is in one of the directions SE, S, SW and W, indicating a noncircular object, an associated one of single shots 290–SE, 290–S, 290–SW and 290–W is triggered, applying a pulse of limited duration to the associated one of AND gates 288. When one of these AND gates is energized, an output signal is generated at an associated one of terminals 292–SE, 292–S, 292–SW and 292–W. Referring to FIG. 13, these terminals are connected to an OR gate 294 which generates an output signal which is applied to another OR gate 296 and to a gate 298. The signal from the gate 298 sets a flip-flop 300, providing an output signal at a terminal 302, indicating that a cell of noncircular shape is being followed by the scanning beam. The flip-flop 300 was previously reset by a signal from the terminal 224 of the circuit of FIG. 7, following the scanning of the previous blood cell, after being delayed by a delay 304.

The signal from the OR gate 294 passing through the OR gate 296 is delayed by a delay 306 to thereafter set a flip-flop 308. The flip-flop 308 was also previously reset by the signal from the delay 304. The signal from the set flip-flop 308 is applied as an inhibiting input to the gate 298 and to a gate 310. The gate 310 controls the setting of a flip-flop 312 which applies signals to an output terminal 314 representative of a circular blood cell being followed. Accordingly, as soon as the OR gate 294 generates an output signal, representing a noncircular blood cell, the gate 310 is inhibited, preventing the flip-flop 312 from ever being set and from ever indicating, during the scanning of this particular blood cell, that the cell is of a circular shape. Accordingly, the only output signal is that appearing at the terminal 302 representing a noncircular blood cell.

Referring again to FIGS. 12a and 12b, assume that the initial movement of the beam in following a blood cell is not in one of the directions SE, S, SW and W but is in one of the directions NW, N, NE and E. These latter four directions are permissible initial directions of beam movement for a blood cell of generally circular shape. A signal from the circuit of FIG. 9 representing one of these four directions of beam movement triggers an associated one of single shots 290–NW, 290–N, 290–NE and 290–E, thereby to energize one input of an associated one of AND gates 316–NW, 316–N, 316–NE and 316–E. The other inputs of these AND gates are already energized by the set flip-flops 286–NW, 286–N, 286–NE and 286–E. The activated one of AND gates 316 sets an associated one of flip-flops 318–NW, 318–N, 318–NE and 318–E to generate an output signal at an associated one of terminals 320–NW, 320–N, 320–NE and 320–E. Referring to FIG. 13, these terminals are coupled to an AND gate 322 which generates an output signal if all of its inputs are energized. Accordingly, if the initial beam movement in followinng a blood cell is in one of the four directions NW, N, NE and E, the associated one of the terminals 320 is energized, energizing that input of the AND gate 322.

Referring again to FIGS. 12*a* and 12*b*, the activation of one of the AND gates 316–NW, 316–N, 316–NE and 316–E, representing a permissible initial direction of beam movement, resets all of the flip-flops 286 except the flip-flop providing an input to the activated AND gate 316 and the flip-flop corresponding to the next permissible direction. For example, if the AND gate 316–NW is activated, corresponding to a northwesterly initial beam movement, the flip-flops 286–NE, 286–E, 286–SE, 286–S, 286–SW and 286–W are reset. The flip-flop 286–NW is not reset, inasmuch as this is the flip-flop that activates the AND gate 316–NW. The flip-flop 286–N is not reset, inasmuch as this is the flip-flop corresponding to the northerly direction, i.e., the direction that follows NW in the proper sequence as given in Diagram 1 above.

By not resetting those of the flip-flops 286 corresponding to the same direction of beam movement and the next permissible direction for a circle, the circuit is made ready to receive another signal representing these directions of beam movement. If any other direction of beam movement is produced, however, the associated one of single shots 290 is triggered, energizing one input of the associated one of AND gates 288. The other input to the AND gate will be energized by virtue of the reset flip-flop 286, thereby generating an output signal at the associated one of terminals 292, coupled to the OR gate 294 of FIG. 13 and producing a signal at the output terminal 302 representing a noncircular blood cell.

For example, assume that the initial direction of beam movement was in the northerly direction, causing a resetting of all the flip-flops 286 except 286–N and 286–NE. The next permissible beam direction for a circular blood cell is NE. If, however, a northwesterly signal is received, the single shot 290–NW is triggered, energizing one input of the AND gate 288–NW. The other input to the AND gate is energized by the reset flip-flop 286–NW, thereby generating a signal at the terminal 292–NW resulting in an ultimate output signal from the terminal 302 of FIG. 13.

It will be noted that each of the terminals NW, N, NE, E, SE, S, SW and W is coupled either directly or through an associated one of diodes 324 to the flip-flop 286 associated with the next permissible direction for a circular blood cell. For example, the terminal N is coupled through diode 324–N to the flip-flop 286–NE. The terminal SE is coupled directly to the flip-flop 286–S. This coupling of each directional terminal to the flip-flop 286 associated with the next permissible direction sets the flip-flop to ready the circuit for a signal in the next permissible direction. The flip-flop may have been previously reset by one of the AND gates 316.

The action described above continues for all beam directional movements. For a proper directional sequence as given in Diagram 1, each new proper directional signal sets the next directional flip-flop 286 and resets all other flip-flops except the flip-flop for the same direction. If anything but a signal representing the same or the next direction is received, the associated one of AND gates 288 is energized, energizing the OR gate 294 of FIG. 13 and producing an output at the terminal 302, representing a noncircular cell shape. If the sequence of beam directional movements is proper for a blood cell of circular shape, the AND gates 316 are energized in sequence and all the terminals 320 of FIGS. 12*a* and 12*b* are ultimately energized. All of the inputs of the AND gate 322 (FIG. 13) are energized, with the exception of the terminal 217. This terminal is connected to the circuit of FIG. 7 and is energized by the single shot 216 at the end of the first complete encirclement of the blood cell by the scanning beam to activate the gate 322. A signal is generated which is applied to the gate 310 and to the OR gate 296. If the gate 310 is not already inhibited by the flip-flop 308, which would occur if it had already been determined that the blood cell is noncircular, the signal from the AND gate 322 is applied through the gate 310 to set the flip-flop 312. The flip-flop 312 applies an output signal to the output terminal 314, indicating a blood cell of circular shape.

If it had not previously been determined that the cell were noncircular, the signal from the AND gate 322 passing through the OR gate 296 and delay 306 sets the flip-flop 308 to inhibit the gates 298 and 310, preventing the flip-flop 300 from being set and from indicating a noncircular cell shape during the remainder of the scanning of the particular blood cell.

*Cell contour length detector 76*

FIG. 14 is a diagram of a circuit for detecting the peripheral length of a blood cell during the first complete encirclement of the cell by the scanning beam. A signal from the clipper 162 of the circuit of FIG. 6 is generated at the terminal 164 when the scanning beam first strikes the blood cell. This signal activates a latching analog gate 326 which holds itself open to apply a signal from the terminal 184 to a base clipper 328. The signal at the terminal 184 is generated by the oscillator 174 of the circuit of FIG. 7. The oscillator signal is responsible for the circular movement of the beam, as described above, and passes through the analog gate 176 of FIG. 7 to the terminal 184.

Referring again to FIG. 14, the base clipper 328 clips the negative pulses, for example, of the signal from the analog gate 326 to produce a positive pulse for each period of the signal from the oscillator 174. The pulse signals are applied to a squarer 330 which generates relatively square wave pulses that are applied to a counter 332 for counting. Each pulse signal applied to the counter is representative of a unit length of the periphery of the blood cell being scanned.

For example, referring to FIG. 4, each pulse applied to the counter 332 corresponds to a different one of the intersections of the scanning beam 104 with the blood cell 34 following the initial intersection at the point 102. For the cell shown in FIG. 4, forty of such intersections and hence forty pulses from the squarer 330 are produced and counted in the counter 332 in one complete encirclement of the blood cell by the scanning beam.

The counter 332 operates to generate output pulses at different selected pulse counts. This is to aid in distinguishing the various types of blood cells encountered. Referring to Table 1, it will be noted that the cell types there tabulated fall into roughly four groups, based upon diameter. The first group, occupied by the red blood cell, is designated by a diameter of 7–8 microns. The second group, occupied by the lymphocyte, neutrophile, eosinophile and basophile, is designated by a diameter of roughly 9–16 microns. The third group, occupied by the monocyte, is categorized by a diameter of 16–25 microns. The platelet and the ruptured cell constitute the fourth group and are categorized by diameters of 1–3 microns and greater than 25 microns, respectively.

The following table relates the diameter of a cell to the pulse count from the counter 332 corresponding to the length of the perimeter of the cell.

Table 4

| Group | Diameter, microns | Pulse Count (perimeter) |
|---|---|---|
| 1 | 7–8 | ≥21 and ≤25 |
| 2 | 9–16 | ≥26 and ≤50 |
| 3 | 16–25 | ≥51 and ≤79 |
| 4 | 1–3<br>>25 | ≤20 or ≥80 |

For example, a cell diameter of from 7–8 microns corresponds to a pulse count in the counter 332 of FIG. 14 of from 21 to 25. It should be noted the pulse count depends upon the magnification of the lens 132 in FIG. 6, and the particular pulse counts in Table 4 are representative only.

In FIG. 14, the counter 332 operates to generate output signals on conductors 334, 336, 338 and 340 representative of pulse counts of 21, 26, 51 and 80, respectively. These particular counts are representative and may be varied as required in the identification of different cell types.

Output signals representative of pulse counts falling within the ranges of the four groups of Table 4 are obtained as follows. The conductors 334, 336, 338 and 340 are coupled to flip-flops 342; 344 and 346; 348 and 350; and 352 and 354, respectively.

Consider a series of pulses applied to the counter 332 during a complete encirclement of a blood cell by the scanning beam. When twenty-one pulses have been applied to the counter 332, an output signal is generated on the conductor 334 which sets the flip-flop 342 and energizes one input of an AND gate 356. Another input to the AND gate is received from the flip-flop 344 in the reset position. This flip-flop is reset unless it is set by a pulse signal on the conductor 336 from the counter 332 indicating a pulse count of 26. Accordingly, if the pulse count from the counter is within the range indicated in Group 1 of Table 4, the flip-flops 342 and 344 energize two of the inputs of the AND gate 356.

At the end of the first complete encirclement of the blood cell by the scanning beam, the pulse at the terminal 217 from the circuit of FIG. 7 sets a normally reset flip-flop 358. This energizes the remaining input to the AND gate 356, thereby activating the AND gate and generating a signal which sets a normally reset flip-flop 360. The flip-flop 360 generates a signal at an output terminal 362 representing a pulse count ≧21 and ≦25.

If the pulse count should equal 26, the conductor 336 from the counter 332 is energized, setting the flip-flop 344 and de-energizing the output from the flip-flop to the AND gate 356. Accordingly, at the end of the first complete encirclement of the blood cell, the AND gate 356 will not have all of its inputs energized and will not generate an output signal to set the flip-flop 360.

If a pulse count of 26 has been reached, the signal from the conductor 336 sets the normally reset flip-flop 346, providing an output signal which energizes one input of an AND gate 364. Another input from the AND gate is received from the reset condition of the flip-flop 348. The flip-flop 348 is normally reset unless it is set by the signal from the conductor 338 representing a pulse count of 51. Accordingly, if at the end of the first complete encirclement of a blood cell, the pulse count is in the range indicated in Group 2 of Table 4, the flip-flops 346 and 348 energize two inputs of the AND gate 364. The remaining input to the AND gate is received from the set position of a normally reset flip-flop 366. This flip-flop is also set at the end of the first complete encirclement of the blood cell by the signal appearing at the terminal 217. If all the inputs to the AND gate are energized, the AND gate is activated to set a flip-flop 368 and to generate an output signal at a terminal 370 representing a pulse count ≧26 and ≦50.

If the pulse count should exceed 50 before the end of the first complete encirclement, the flip-flop 348 is set by the signal from the conductor 338 which generates a signal at the fifty-first count. This de-energizes the input to the AND gate 364 from the flip-flop and prevents the AND gate from being activated.

A pulse on the conductor 338 indicating a count of 51 also sets the flip-flop 350 to energize one output of an AND gate 372. Another input to the AND gate is received from the flip-flop 352 in its normally reset position. The flip-flop 352 is set by the signal from the conductor 340 representing a count of 80. A flip-flop 374 normally reset provides the remaining input to the AND gate when it is set at the end of the first complete encirclement of the blood cell. The AND gate 372 is therefore activated to set a normally reset flip-flop 376 and to generate an output signal at a terminal 378 if the pulse count is in the range indicated by Group 3 in Table 4.

If the pulse count reaches 80, the flip-flop 352 is set, preventing the AND gate 372 from being activated. The signal from the conductor 340 also sets the normally reset flip-flop 354 to generate an output signal which is applied to an OR gate 380. The OR gate sets a normally reset flip-flop 382 to generate an output signal at a terminal 384. A signal at the terminal 384 is representative of a pulse count falling within the ranges indicated by Group 4 in Table 4. In the specific example just chosen, a pulse count of 80 was reached.

If the pulse count during the encirclement was <21, none of the counter conductors 334, 336, 338 and 340 would be energized, and accordingly none of the AND gates 356, 364 and 372 would be energized. These AND gates are coupled by inverters 386, 388 and 390 to an AND gate 392. The lack of an output signal from one of the AND gate 356, 364 and 372 produces an output signal from the corresponding one of the inverters. Accordingly, if all these AND gates are de-activated, the inverters all generate signals which are applied to the AND gate 392. At the end of the first complete encirclement of the blood cell by the scanning beam, the signal at the terminal 217, after a slight delay provided by a delay 394, energizes the remaining input to the AND gate 392, activating the gate. A signal is generated which is coupled through the OR gate 380 to the flip-flop 382 to generate an output signal at the terminal 384. In this example, the signal is representative of a pulse count <21.

At the end of the first complete encirclement of the blood cell by the scanning beam, the signal at the terminal 217 sets a normally reset flip-flop 396 to generate a signal which is applied to the latching analog gate 326 to inhibit that gate. This prevents signals from being applied through the gate during the second complete encirclement of the blood cell by the scanning beam. The signal from the terminal 217 is also used to reset the counter 332 as well as to reset all the flip-flops 342, 358, 344, 346, 366, 348, 350, 374, 352 and 354 after a delay provided by the delay 394 and an additional delay 398.

FIG. 15 shows a representative circuit for instrumenting the counter 332 of FIG. 14. For the purpose of explanation, a circuit is shown capable of counting from 1 to 16 pulses. Four flip-flops 400, 402, 404 and 406 are utilized for developing output signals at terminals represented by $2^0$ and $\overline{2^0}$, $2^1$ and $\overline{2^1}$, $2^2$ and $\overline{2^2}$, and $2^3$ and $\overline{2^3}$, respectively. Each of the flip-flops generates complementary output signals, so that when one output is active, the other output is inactive.

A reset signal is applied to terminal 408 to reset the flip-flops 400, 402, 404 and 406 and hence to render inactive the output terminals $2^0$, $2^1$, $2^2$ and $2^3$. Input signals are applied serially to a terminal 410 and pass through a delay 412 to change the state of the flip-flop 400. The delay 412 delays the triggering of the flip-flop 400 so that the states of the output terminals $2^0$ and $\overline{2^0}$ are not changed until after the input pulse applied to the terminal 410 has terminated. The terminal $2^0$ is coupled to an AND gate 414, as is the terminal 410.

FIG. 15*a* shows the states of the output terminals $2^0$, $2^1$, $2^2$ and $2^3$ for each of seventeen serial input pulses. It will be noted that the termial $2^0$ is active, i.e., in a state indicated as 1, when every even numbered pulse appears at the terminal 410. Accordingly, the AND gate 414 is energized to pass every even numbered input pulse from the terminal 410 through a delay 416 to the flip-flop 402 and to an AND gate 418. The other input of this AND gate is derived from the terminal $2^1$. From FIG. 15*a*, it will be noted that this terminal is in the active state, providing an energizing input to the AND gate 418 when every fourth pulse at the input terminal 410 passes through the AND gate 414.

Every fourth input pulse therefore passes through the AND gate 418 and through a delay 420 to the flip-flop 404. The pulse also provides an energizing input to an AND gate 422. The terminal $2^2$ from the flip-flop 404 provides the remaining energizing input to this AND gate, and it will be noted from FIG. 15*a* that this input is active when every eighth pulse at the input 410 passes through the AND gates 414 and 418. Accordingly, every eighth input pulse passes through the AND gate 422 and through a delay 424 to the flip-flop 406. The pulse appears on a conductor 426 which, together with a conductor 428 connected to the terminal $2^3$, may be connected to further stages the same as those shown in FIG. 15 to provide a counter capable of counting pulses greater in number than sixteen.

As will be noted from FIG. 15*a*, after the sixteenth pulse the states of the terminals $2^0$, $2^1$, $2^2$ and $2^3$ are again all inactive, and the circuit is readied to receive another sixteen pulses.

The states of the output terminals $2^0$, $2^1$, $2^2$ and $2^3$ at any time are representative of the number of pulses that have previously appeared at the terminal 410. The number of pulses is determined by noting the active ones of these terminals, and summing the designations of the terminals. For example, assume that the terminals $2^0$, $2^1$ and $2^3$ are active. This indicates that eleven pulses have appeared at the terminal 410, since $2^0=1$, $2^1=2$ $2^3=8$ and $8+2+1=11$. This is verified by FIG. 15*a*.

The circuit of FIG. 15 can be used to generate a disete output pulse for any one of sixteen serial pulses; lat is, the circuit may serve as a counter to provide an utput pulse at any count from 1 to 16 of a series of input ulses. This is achieved by employing selected ones of le terminals $2^0$ and $\overline{2^0}$, $2^1$ and $\overline{2^1}$, $2^2$ and $\overline{2^2}$ and $2^3$ and $\overline{\phantom{2}}^3$ in a circuit such as shown in FIG. 16, which provides n output pulse after six input pulses have been counted. he terminals $2^0$, $\overline{2^1}$, $2^2$ and $\overline{2^3}$ are applied to an AND ate 430. The terminals $2^0$ and $2^2$ are active or energized fter five input pulses have appeared at the terminal 410. t this time, the terminals $\overline{2^1}$ and $\overline{2^3}$ are active, inasmuch s the complementary terminals $2^1$ and $2^2$ are inactive. ccordingly, following the fifth input pulse at the terinal 410, the AND gate 430 is activated, energizing one nput of an AND gate 432. The other input of this AND ate is derived from the input terminal 410 supplied with le input pulses to be counted. Thus, when the sixth ulse appears at the terminal 410, both of the inputs of le AND gate 432 are energized, generating an output ignal at a terminal 434 representative of six pulses that ave appeared at the terminal 410. Following this, the AND gate 430 is de-activated and no output signals may e generated at the terminal 434.

In this fashion, the circuit of FIG. 15 may be utilized o provide a counter for any number of pulses from 1 o 16. To count $n$ pulses, the sum of the active ones f terminals $2^0$, $2^1$, $2^2$, $2^3$ . . . should equal $n-1$. These ctive terminals are applied as inputs to the AND gate 30 of FIG. 16. Selected ones of the terminals $\overline{2^0}$, $\overline{2^1}$, $\overline{2^2}$, $\overline{2^3}$ . . . corresponding to the inactive ones of terninals $2^0$, $2^1$, $2^2$, $2^3$ . . . are also applied to this AND ate. The $n$th input pulse occurring activates the AND ate 432 to generate an output signal.

*Secondary scan control 84*

The circuit of FIG. 17 determines the selected scanions across the blood cell during the second complete ncirclement of the blood cell by the scanning beam. As lescribed above with respect to FIG. 5, the scansions are paced and cross the cell from left to right, and hence can occur only when the general beam movement around he periphery of the cell is in the northwesterly, northerly or northeasterly direction.

In FIG. 17, the terminals NW, N and NE from the circuit of FIG. 9 are coupled to an OR gate 436. Whenever the beam movement is in one of these three general lirections, the OR gate is activated providing an energizng input to an AND gate 438. The other input to this AND gate is derived from a squarer 440 receiving signals from a base clipper 442 coupled to the terminal 184. The terminal 184 receives a signal from the oscillator 174 of FIG. 7 through the analog gate 176. The base clipper 442 removes the negative pulses of the oscillator signal to produce positive pulses which are formed into square wave pulses by the squarer 440. Each of these pulses corresponds to a different intersection of the scanning beam with the blood cell, as shown in FIG. 5. The AND gate 438 passes these pulses when the beam is travelling in a general northwesterly, northerly or northeasterly direction about the periphery of the blood cell.

Signals from the AND gate 438 are applied to a counter 444 which is initially reset by a signal at the terminal 217 from the circuit of FIG. 7. This signal occurs at the end of the first complete encirclement of a blood cell. The signal at the terminal 217 also opens a normally inhibited latching gate 446 to pass signals from the counter therethrough. Accordingly, the latching gate is open only during the second encirclement of a blood cell when the selected transverse scansions across the cell occur.

The counter 444 operates to generate an output pulse for every fourth input pulse, for example. Referring also to FIG. 5, assume that the second encirclement of the blood cell 34 commences at the point 102 and proceeds in a clockwise direction. When the scanning beam reaches the point 34–2, four pulses will have been counted in the counter 444, which generates a signal that passes through the latching gate 446 to set flip-flops 448 and 450. The set flip-flop 450 generates a signal at the output terminal 178 which provides an inhibiting input to the analog gate 176 of FIG. 7. After the fourth input pulse, then, the signal from the oscillator 174 no longer passes through the analog gate 176, and the circular movement of the scanning beam ceases. Inasmuch as the $x$ and $y$ sawtooth generators 166 and 168 are also inactive, the scanning beam is momentarily halted.

The set flip-flop 448, however, sets another flip-flop 452 which provides an energizing signal to a Miller integrator 454. The integrator integrates a constant signal from the flip-flop 452 to generate a signal of sawtooth waveform which is applied to an analog gate 456. This gate is provided with a gating signal from the set flip-flop 448 to permit the signal from the Miller integrator 454 to pass to output terminal 458 connected to the $x$ adder 170 of FIG. 7. Accordingly, the signal applied from the $x$ adder to the $x$ deflection plates 120 of the cathode ray tube 114 of FIG. 6 is a sawtooth signal which causes the scanning beam to scan across the blood cell, as designated by the beam 108–1 in FIG .5.

The set flip-flop 452 that energizes the Miller integrator 454 also provides an energizing input to an AND gate 460. This AND gate is provided with another energizing input from the set flip-flop 448, and thus generates a signal which is applied to an OR gate 462 while the scanning beam is traversing the blood cell. The output signal from this OR gate is connected to terminal 126 connected to the beam control electrode 118 of the cathode ray tube of FIG. 6. This signal maintains an active beam during this time.

While the scanning beam is traversing the blood cell, the signal from the clipper 162 of FIG. 6, appearing at the terminal 164, is at a higher one of two levels. The terminal 164 is coupled to an AND gate 464 and to an inverter 466. The AND gate 464 is also energized by the set flip-flop 448, and thus an output signal is generated at an output terminal 468 from this gate during the time that the scanning beam traverses the blood cell.

Inasmuch as the signal at the terminal 164 is active during this time, the output signal from the inverter 466 is inactive. When, however, the scanning beam completely traverses the blood cell, for example, when the beam 108–1 in FIG. 5 reaches the point 34–1, the signal at the terminal 164 drops sharply. The AND gate 464 is accordingly de-activated, terminating the output signal at the terminal 468. The inverter 466, however, generates an output signal which resets the flip-flop 452. This removes the input signal from the Miller integrator 454, whose output signal decays rapidly to 0. The scanning beam is thus returned from the point 34–1 in FIG. 5 towards the point 34–2.

During this time, the AND gate 460 is de-activated, inasmuch as the flip-flop 452 no longer provides an energizing input to the gate. The OR gate 462 is de-activated also, inasmuch as the flip-flop 448 is still set. No signal appears at the terminal 126, therefore, and hence the scanning beam in the cathode ray tube 114 of FIG. 6 is blanked due to the absence of an energizing signal on the beam intensity control electrode 118.

When the blanked scanning beam returns to the point 34–2 in FIG. 5, the signal from the Miller integrator 454 is 0, which is detected by a null detector 467. The null detector generates an output signal which resets the flip-flops 448 and 450. The reset output from the flip-flop 448 activates the OR gate 462, energizing the terminal 126 and unblanking the scanning beam in the cathode ray tube 114 of FIG. 6. Resetting the flip-flop 450 removes the signal from the terminal 178 which de-inhibits the analog gate 176 of FIG. 7 and permits the oscillator signal to pass through the gate to cause the scanning beam again to follow the circular scanning movement about the periphery of the blood cell.

Referring to FIG. 5, it will be noted that the scanning beam strikes the periphery of the cell at points 109 and 110 while moving in a general northeasterly direction from the point 34–2. Accordingly, the counter 444 of FIG. 17 registers a count of 2. Thereafter, the beam moves in an easterly direction roughly to the point 34–1, in a southeasterly direction to the point 112 and continues circling the blood cell until it reaches the bottom of the blood cell just before the point 111. All during this time, the direction of the movement is not northwesterly, northerly or northeasterly, and the OR gate 436 is not activated, thereby leaving the AND gate 438 deactivated. The counter 444 therefore retains the count of 2. In moving from the bottom of the blood cell to the point 111, the beam movement is generally northwesterly, and when the point 111 is reached, a pulse is generated which is counted in the counter 444. When the point 34–3 is reached, the counter emits an output pulse which causes the circuit of FIG. 17 to go through the same action is described above, causing the circular scansions to stop and the transverse scansion across the blood cell to take place.

When the beam returns to the point 34–3 after the transverse scansion, it travels along the blood cell until the point 34–4, when another count of 4 is registered by the counter 444 to generate an output signal that causes the beam to scan across the blood cell. The same thing occurs at the point 34–5.

Following the return of the beam to the point 34–5, three more output pulses are counted by the counter 444 when the beam completes the second encirclement of the blood cell and returns to the point 102. At this time, the null detectors 210 and 212 of FIG. 7 generate output signals activating the AND gate 214, single shot 216 and the AND gate 218 to generate an output pulse at the terminal 224 indicating the completion of the second encirclement. The signal from the terminal 224 inhibits the latching gate 446 of FIG. 17 and prevents the occurrence of any further transverse scans.

Inasmuch as the inverter 196 of FIG. 7 is energized, it generates no output signal, thereby de-activating the AND gate 192 and preventing any signals from triggering the single shot 200. The flip-flop 202 is also reset, deenergizing the conductors 204 and 206 coupled to the $x$ and $y$ sawtooth generators 166 and 168. The sawtooth generators are thus released and commence to generate the sawtooth signals again, producing the search raster in the blood slide to search for another blood cell.

In this regard, it will be noted that the signal from the $x$ integrator 188 of FIG. 7 is applied to the peak detector 226. The peak detector detects the maximum value of the $x$ signal, representative of the farthest movement of the scanning beam to the right (FIG. 4) when travelling about the periphery of a blood cell. This signal is applied through the analog gate 228, which is energized by the signal from the AND gate 218, to the $x$ sawtooth generator 166. This controls the sawtooth generator so that the sawtooth signal starts to the right of the blood cell and clears the blood cell when commencing the search raster. This is shown in FIG. 5 by the dotted line 470.

*Internal features detector 88*

The circuit of FIG. 18 detects the internal features of the blood cell during the selected transverse scansions across the cell. Referring to FIG. 18, signals at the terminals 156, 158 and 160 from the circuit of FIG. 6, representing the colors pink, red and blue, respectively, are applied to flip-flops 472 and 474 and clipper 476, respectively. When either or both of the colors pink and red are detected, the corresponding ones of the flip-flops 472 and 474 are set. The signal from the flip-flop 472 provides an input to an AND gate 478, the other input to which is connected to the terminal 468 in the circuit of FIG. 17. As described in connection with that figure, a signal is generated at the terminal 468 during the entire time that the scanning beam crosses the blood cell. Accordingly, as soon as the color pink is detected during such a transverse scansion, a flip-flop 480 is set, generating an output signal at a terminal 482 representing this color.

The AND gate 478 is connected to an AND gate 484, the other input to which is connected to the flip-flop 474. The AND gate 484 is thus activated when the colors pink and red are together detected during a transverse scansion, and a signal is generated which sets a flip-flop 486. The flip-flop 486 generates an output signal at a terminal 488 representing red granules. The concurrence of red and pink colors to indicate red granules is deemed desirable to avoid spurious information, inasmuch as red granules are only present in a blood cell when pink cytoplasm is also present.

The color blue, when detected, results in a signal at the terminal 160 which is applied to the clipper 476. The clipper receives a signal from the terminal 164 of the circuit of FIG. 6, which is used to determine the clipping level of the clipper. The signal from the clipper passes through an analog gate 492 which is activated by the signal from the terminal 468 of FIG. 17 during the transverse scansions across the blood cell. The "blue" signal from the analog gate is applied to pulse amplitude decoders 494 and 496.

The pulse amplitude decoder 494 generates an output signal only in response to an input signal of relatively low amplitude, corresponding to the color light blue. This signal sets a flip-flop 498 to generate an output signal at terminal 500 representative of light blue cytoplasm detected for the blood cell scanned.

The pulse amplitude decoder 496 generates an output signal only in response to input signals of relatively high amplitude, corresponding to the color dark blue. These signals are applied to a pulse width decoder 502 which generates an output signal only after an input signal persists for a predetermined time, corresponding to the scansion across a dark blue nucleus of relatively large size. The signal from the pulse width decoder sets a flip-flop 504 to generate an output signal at a terminal 506, indicating that a dark blue nucleus has been sensed.

The signal from the pulse ampilitude decoder 496 is also coupled to a single shot 508, which generates a single output pulse for each discrete signal from the pulse amplitude decoder. Accordingly, for a dark blue nucleus, a single signal is generated by the single shot during the scansion across the nucleus. When dark blue granules are detected, however, the single shot generates a series of pulse signals, each pulse corresponding generally to a single granule. Pulses from the single shot 508 are counted in a counter 510 which generates an output signal after an arbitrary number of pulses has been counted. This number is established sufficiently high to ensure that dark blue granules have in fact been detected. The output signal from the counter 510 sets a flip-flop 512 to generate an output signal at a terminal 514 to indicate that dark blue granules have been sensed.

The various flip-flops and counter 510 of FIG. 18 are all reset at the end of the second encirclement of the blood cell by the pulse signal applied to the terminal 224 from the circuit of FIG. 7. For this purpose, a delay 516 is incorporated to ensure the proper sequence of resetting.

*Cell recognizer and tabulator 78*

The circuit of FIG. 19 operates upon all of the information generated by the circuits described previously to determine the types of cells scanned. The terminals 314 and 302 from the circuit of FIG. 13, representative of whether a cell is circular or noncircular, respectively, are coupled to a composite conduit 518. The terminals 362, 370, 384 and 378 from the circuit of FIG. 14, representing the peripheral length of the blood cell, are also coupled to the conduit 518. The terminals 482, 488, 506, 514 and 500 from the circuit of FIG. 18, representing the colors and types of particles constituting the internal part of the cell, are applied to the conduit 518. The terminal 224 from the circuit of FIG. 7, carrying a signal at the end of the second complete encirclement of a blood cell by the scanning beam, is connected to the conduit 518.

The conduit 518 is connected to logic circuits 520–1, 520–2 . . . 520–*n*, each of which corresponds to a different one of the cell types to be recognized. Each of the logic circuits operates upon the input signals to generate an output signal only if the circuit determines that the cell scanned is of the type represented by the circuit.

The logic circuits 520 are coupled to AND gates 522–1, 522–2 . . . 522–*n*, each of which receives an input signal from the terminal 224 of FIG. 7. The logic circuits are also coupled to a 2-out-of-6-gate 524 which generates an output signal applied to an inverter 526 and an OR gate 528 if any two of the logic circuits generate output signals. If such is the case, a single cell has been identified as being two or more different cell types, an impossible situation. The signal applied to the inverter 526 removes a necessary signal from all of the AND gates 522, preventing an output from any of these gates. Concurrently, the energized OR gate 528 provides an input to an AND gate 530. At the end of the second complete encirclement, the pulse from the terminal 224 activates the AND gate 530 to provide a signal to a reject counter 532 which tabulates the improper cell determination.

If the 2-out-of-6 gate 524 is not energized, the inverter 526 generates an active output signal which provides an energizing input to all of the AND gates 522. Accordingly, that one of the AND gates 522 energized by the corresponding logic circuit 520 is activated upon the occurrence of the pulse from the terminal 224, generating an output signal which is counted in a corresponding one of counters 534–1, 534–2 . . . 534–*n*.

If none of the logic circuits 520 generates an output signal, representing no classification of a scanned cell, an OR gate 536 connected to all of the logic circuits 520 is de-activated, de-energizing an inverter 538. The inverter therefore generates an active output signal which is coupled through the OR gate 528 to the AND gate 530. The AND gate 530 is activated at the end of the second complete encirclement of the cell by the signal from the terminal 224, and thus the reject counter 532 tabulates the lack of cell classification.

It will be noted, then, that the counters 534 tabulate the cell types, and the reject counter 532 tabulates the improper classifications as well as failures to classify.

The logic circuits 520 each may assume the form of a circuit such as that shown in FIG. 20, which is the logic circuit for detecting a neutrophile. FIG. 20 is best understood by reference to FIG. 21, which tabulates for the six different blood cell types considered as important the characteristic features of the types in terms of cell shape, cell peripheral length and cell interior features. In the figure, the presence or absence of a particular feature for a given cell type is represented by "yes" and "no," respectively. For example, the neutrophile is characterized by a circular shape, a cell peripheral length represented by a pulse count of from 26 to 50, and the presence of pink cytoplasm and a dark blue nucleus. Stated conversely, to constitute a neutrophile it is necessary that the object scanned is not noncircular, that the cell peripheral length does not fall within ranges other than the range represented by 26–50 pulses, and that light blue cytoplasm, dark blue granules and red granules are not present.

In order to unambiguously distinguish one cell from another, it is not necessary to utilize all the information provided by the table in FIG. 21. The information necessary to distinguish the six cells chosen by way of example has been designated by checkmark. For example, for the neutrophile it is considered necessary to detect that the cell is circular and has pink cytoplasm and a dark blue nucleus. It is also considered necessary to detect that the cell is not noncircular, although this criterion is already satisfied if the cell is detected as being circular. The use of these two shape criteria, while redundant, provides a check on the proper operation of the system. It is finally considered necessary to detect that the cell peripheral length is not represented by a pulse count $\leqq 20$ or $\geqq 80$, and that the cell has no light blue cytoplasm or red granules.

It will be noted from the checked criteria for the neutrophile that the required cell peripheral length representation of from 26 to 50 pulses is not considered necessary to distinguish the cell from the other cells. By thus not limiting the representation of cell peripheral length, but requiring that the length not be represented by a pulse count $\leqq 20$ or $\geqq 80$, the system can recognize neutrophiles which fall out of this particular range. For this reason, "no" information regarding cell peripheral length is also utilized in detecting the red blood cell, the eosinophile and the basophile, while only the lymphocyte and the monocyte require "yes" information for this feature.

Given the checked criteria in FIG. 21 as characterizing a neutrophile, the circuit of FIG. 20 generates a signal only if such criteria are met. Turning to FIG. 20, a signal from the terminal 314 of FIG. 13 representing a circular cell shape is applied to an AND gate 540. The terminal 482 from the circuit of FIG. 18 representing pink cytoplasm, is also connected to this AND gate. The terminal 506 also from the circuit of FIG. 18, representing a dark blue nucleus, provides the remaining input to the AND gate. If all these inputs are energized, corresponding to the required positive criteria from the table of FIG. 21, the AND gate 540 is energized, energizing one input of an AND gate 542. The other input to the AND gate is derived from the reset output of a normally reset flip-flop 546. If the flip-flop is reset, the AND gate 542 is activated and generates an output signal at a terminal 548 connected to a corresponding one of the counters 534 of FIG. 17, thereby to tabulate a detected neutrophile.

The terminal 302 from the circuit of FIG. 13, representing a noncircular cell shape, is applied to an OR gate 544. The terminal 384 from the circuit of FIG. 14, representing a pulse count $\leqq 20$ or $\geqq 80$, is also applied to the OR gate. The terminal 500 from the circuit of FIG. 18, representing light blue cytoplasm, is connected to the OR gate. The terminal 488 also from the circuit of FIG. 18, representing red granules, provides the final input to the OR gate. If a signal is present at any of the terminals 302, 384, 500 and 488, representing the presence of one of the negative criteria of the table of FIG. 21 for the neutrophile, the OR gate 544 is activated, setting the normally reset flip-flop 546. This removes an energizing signal from the AND gate 542, preventing an output signal from being generated at the terminal 548.

At the end of the second complete encirclement of the blood cell and following the determination of the cell type, the flip-flop 546 is reset by a signal applied thereto from the terminal 224 (the circuit of FIG. 7) through a suitable delay 550.

Circuits such as that shown in FIG. 20 are required for all the remaining blood cells to be recognized, namely, the red blood cell, the eosinophile, the basophile, the lymphocyte and the monocyte. For each of these cells, the logic circuit will constitute an AND gate such as the gate 540 in FIG. 20 supplied with input signals corresponding to the "yes" criteria of the table of FIG. 21 for the cell. An OR gate similar to the gate 544 of FIG. 20 will also be required supplied with input signals corresponding to the "no" criteria. Of course, different combinations of criteria than those given in the table of FIG. 21 may be employed to adequately distinguish one cell from another.

*Summary*

The invention described above provides for the recognition of different patterns, and particularly the recognition of different blood cell types. Search scanning is employed to detect blood cells on a slide, with a contour following and selected transverse scansion utilized to interrogate each cell to determine shape, size and interior features. The information developed for each cell is utilized to classify the cell.

The recognition of different cell types as accomplished by the present invention is useful in the mass scanning of blood slides for entire population groups to separate out common slides from those which may represent diseases or other abnormalities. This renders possible the freeing of technical personnel to personally screen in detail selected slides which may be suspicious.

While the invention has been particularly shown and described with reference to preferred embodiments thereof, it will be understood by those skilled in the art that various changes in form and detail may be made therein without departing from the spirit and scope of the invention.

What is claimed is:

1. In a system for recognizing and distinguishing blood cells, the combination of first means for carrying out at least one of the following functions:

(1) determining the peripheral length of a blood cell;

(2) classifying a blood cell as of generally circular shape or noncircular shape;

and second means for determining the internal features of a blood cell.

2. A system as recited in claim 1, wherein the first means includes means for detecting the directions in which the various line segments extend that define the periphery of the blood cell, means for generating a first output if the directions of the line segments proceeding around the periphery of the cell change in accordance with the following diagram:

N
NW NE
W E
SW SE
S wherein N, NE, E, SE, S, SW, W and NW respectively represent the directions north, northeast, east, southeast, south, southwest, west and northwest commencing with any direction in the diagram and proceeding clockwise or counterclockwise around the diagram corresponding to proceeding clockwise or counterclockwise around the periphery of the cell, and means for generating a second output if the sequence departs from the sequence given by the diagram.

3. A system as recited in claim 1, wherein the second means detects the colors present in the blood cell.

4. In a system for recognizing and distinguishing blood cells, the combination of means for determining the peripheral length of a blood cell, means for determining whether the cell is of generally circular or noncircular shape, and means for determining the colors present in the cell.

5. A system as defined in claim 4, wherein the last named means detects the color of cytoplasm, as well as the presence and colors of nucleus and granules in the cell.

6. In a system for recognizing blood cells, the combination of scanning means for causing a scanning beam to impinge upon an area containing a blood cell to be recognized, first beam control means for causing the scanning beam to encircle at least once the cell to be recognized by following the periphery of the cell, and second beam control means for causing the scanning beam to scan across the cell in selected line scans.

7. A system as recited in claim 6, wherein the first beam control means causes the scanning beam to intersect the periphery of the blood cell as the beam encircles the cell, and wherein the second beam control means includes means enabled when the beam moves about the periphery of the cell in any of selected directions for generating a control signal corresponding to every *n*th intersection, means responsive to the control signal for causing the beam encirclement to cease and to initiate a line scan across the cell, means responsive to the line scan leaving the cell to return the scanning beam to the point on the periphery of the cell where the line scan began, and means responsive to the return of the scanning beam to the point on the periphery to recommence the encirclement of the cell by the scanning beam.

8. A system as recited in claim 6, wherein the second beam control means is responsive to the movement of the scanning beam about the periphery of the blood cell in selected directions and causes the scanning beam to scan across the cell in line scans spaced from each other.

9. A system as recited in claim 8, wherein the second beam control means includes means for generating a control signal when the beam has moved a predetermined distance along the periphery of the blood cell in the selected directions, and means responsive to the control signal for initiating a line scan across the cell.

10. In a system for recognizing and classifying blood cells stained to produce characteristic colors of cytoplasm, nucleus and granules, the combination of scanning means for developing a scanning beam that impinges upon an area containing a blood cell, first beam control means for causing the scanning beam to encircle at least once the periphery of the cell, second beam control means for causing the scanning beam to scan across the cell in selected line scans, means responsive to the movement of the beam about the periphery of the cell for determining the size and shape of the cell, and color detection means responsive to the selected line scans of the beam across the cell for detecting the color of the cytoplasm of the cell and the presence and color of a nucleus and granules in the cell.

11. A system as recited in claim 10, wherein the cells are stained with Wright's Stain, and wherein the color detection means comprises pink and red color separation filter means for generating pink and red signals representative of the colors pink and red respectively in the blood cell scanned by the scanning beam, and means responsive to the concurrence of pink and red signals for generating an output signal representative of the presence of red granules in the cell.

12. A system as recited in claim 10, wherein the cells are stained with Wright's Stain, and wherein the color detection means comprises blue color separation filter means for generating a blue signal representative of the color blue in the blood cell scanned by the scanning beam, means responsive to the blue signal for generating a dark blue signal when the amplitude of the blue signal is greater than a predetermined magnitude and for generating a light blue signal when the amplitude of the blue signal is less than a pre-established magnitude, means responsive to the dark blue signal for generating a first output signal representative of a dark blue nucleus in the cell if the dark blue signal is continuous for at least a predetermined time, and means responsive to the dark blue signal for generating a second output signal representative of the presence of dark blue granules in the cell if the dark blue signal comprises a series of pulse signals each of a duration less than the predetermined time.

13. In a system for recognizing and classifying different types of blood cells stained to develop characteristic olors of cytoplasm, nucleus and granules, wherein a ucleus and granules may be present in the same color, he combination of means for illuminating a stained lood cell with a scanning beam, means responsive to he scanning of the color representing the nucleus and ranules for generating a first signal, means responsive o the first signal being continuous for a predetermined ime for generating a first output signal representative f a nucleus being scanned, and means responsive to the irst signal consisting of a series of pulse signals each of duration less than the predetermined time for generating second output signal representative of granules being canned.

14. In a system for recognizing and classifying different ypes of blood cells stained to develop characteristic olors of cytoplasm, nucleus and granules, wherein a ucleus and cytoplasm may be present as different shades f the same color, the combination of means for illuminating a stained blood cell, means responsive to the llumination of the color representing the nucleus and ytoplasm for generating a first signal, means responsive o a first signal of a magnitude greater than a predetermined magnitude for generating a first output signal epresentative of a dark shade of the color, and means esponsive to a first signal of a magnitude less than a re-established magnitude for generating a second output ignal representative of a light shade of the color.

15. In a system for recognizing and classifying different ypes of blood cells, the combination of first means for interrogating a cell to detect at least one of the shape and size of the cell, and second means for interrogating the cell to detect the colors of the cell when the cell is stained to produce characteristic colors of cytoplasm, as well as nucleus and granules if present in the cell.

16. A system as recited in claim 15 for detecting red blood cells, wherein said first means distinguishes between substantially circular and noncircular cells and rejects cells having peripheral lengths substantially within the range 51 to 79 microns, and wherein said second means detects the presence of pink cytoplasm as well as the absence of light blue cytoplasm and a dark blue nucleus in a cell.

17. A system as recited in claim 15 for detecting neutrophiles, wherein said first means distinguishes between substantially circular and noncircular cells and rejects cells having peripheral lengths substantially less than or equal to 20 microns or greater than or equal to 80 microns, and wherein said second means detects the presence of pink cytoplasm and a dark blue nucleus as well as the absence of light blue cytoplasm and red granules in a cell.

18. A system as recited in claim 15 for detecting eosinophiles, wherein said first means distinguishes between substantially circular and noncircular cells and rejects cells having peripheral lengths substantially less than or equal to 20 microns or greater than or equal to 80 microns, and wherein said second means detects the presence of pink cytoplasm and dark blue nucleus and red granules as well as the absence of light blue cytoplasm in a cell.

19. A system as recited in claim 15 for detecting basophiles, wherein said first means distinguishes between substantially circular and noncircular cells and rejects cells having peripheral lengths substantially less than or equal to 20 microns or greater than or equal to 80 microns, and wherein said second means detects the presence of light blue cytoplasm and dark blue granules as well as the absence of pink cytoplasm in a cell.

20. A system as recited in claim 15 for detecting lymphocytes, wherein said first means distinguishes between substantially circular and noncircular cells and detects those cells having peripheral lengths substantially within the range 26 to 50 microns, and wherein said second means detects the presence of light blue cytoplasm as well as the absence of pink cytoplasm and dark blue granules in a cell.

21. A system as recited in claim 15 for detecting monocytes, wherein said first means distinguishes between substantially circular and noncircular cells and detects those cells having peripheral lengths substantially within the range 51 to 79 microns, and wherein said second means detects the presence of light blue cytoplasm as well as the absence of dark blue granules in a cell.

References Cited by the Examiner

UNITED STATES PATENTS

| | | | |
|---|---|---|---|
| 2,791,150 | 5/1957 | Stevens | 88—14 |
| 2,875,666 | 3/1959 | Parker et al. | 88—14 |
| 2,978,675 | 4/1961 | Highleyman | 340—146.3 |
| 3,064,519 | 11/1962 | Shelton | 340—146.3 |
| 3,084,286 | 4/1963 | Leo | 328—42 |
| 3,149,286 | 9/1964 | Simmons | 328—51 |
| 3,189,873 | 6/1965 | Rabinow | 340—146.3 |

FOREIGN PATENTS

| | | |
|---|---|---|
| 152,247 | 7/1951 | Australia. |
| 948,498 | 2/1964 | Great Britain. |

OTHER REFERENCES

"Reading by Electronics," Wireless World, April 1957, pp. 173–175.

"Edge Following Scanner," by Allen et al., IBM Tech. Disc. Bull., volume 6, No. 2, July 1963, pp. 99 and 100.

References Cited by the Applicant

UNITED STATES PATENTS

| | | |
|---|---|---|
| 2,969,708 | 1/1961 | Polanyi et al. |
| 2,983,822 | 5/1961 | Brouillette. |

OTHER REFERENCES

Bostrom et al., Instrumentation for Automatically Prescreening Cytological Smears, November 1959, Proceedings of the IRE, page 1895.

Greanias et al., The Recognition of Handwritten Numerals by Contour Analysis, IBM Journal, January 1963, page 14.

MAYNARD R. WILBUR, *Primary Examiner.*

MALCOLM A. MORRISON, *Examiner.*

J. E. SMITH, *Assistant Examiner.*